United States Patent [19]
Nishida et al.

[11] Patent Number: 6,136,879
[45] Date of Patent: Oct. 24, 2000

[54] SOFT POLYURETHANE FOAM, METHOD OF PRODUCING THE SAME AND VEHICLE INTERIOR MEMBER USING THE SAME

[75] Inventors: Kiyomi Nishida, Inuyama; Shuichi Takahashi, Kani; Kunio Sasaoka; Masashi Obata, both of Yokohama, all of Japan

[73] Assignees: Tokai Rubber Industries, Ltd.; Mitsui Chemicals, Inc., both of Japan

[21] Appl. No.: 09/178,314

[22] Filed: Oct. 23, 1998

[30] Foreign Application Priority Data

Oct. 28, 1997 [JP] Japan ................................. 9-295713
Aug. 7, 1998 [JP] Japan ............................... 10-224655
Oct. 8, 1998 [JP] Japan ............................... 10-286825

[51] Int. Cl.$^7$ ................................................. C08G 18/04
[52] U.S. Cl. .................... 521/174; 521/51; 521/163; 521/170
[58] Field of Search .............................. 521/51, 155, 170, 521/163, 174

[56] References Cited

U.S. PATENT DOCUMENTS

| | | |
|---|---|---|
| 3,205,005 | 9/1965 | Brown . |
| 3,405,077 | 10/1968 | Pastor et al. . |
| 3,457,203 | 7/1969 | Cohen et al. . |
| 4,190,697 | 2/1980 | Ahrens . |
| 4,980,386 | 12/1990 | Tiao et al. . |
| 5,105,491 | 4/1992 | Yoshiyuki et al. . |
| 5,284,880 | 2/1994 | Harrison et al. . |
| 5,847,014 | 12/1998 | Nodelman et al. . |

FOREIGN PATENT DOCUMENTS

| | | |
|---|---|---|
| 0 386 974 | 9/1990 | European Pat. Off. . |
| 0 406 702 | 1/1991 | European Pat. Off. . |
| 0 451 559 | 10/1991 | European Pat. Off. . |
| 56-36514 | 4/1981 | Japan . |
| 60-177035 | 9/1985 | Japan . |
| 60-219220 | 11/1985 | Japan . |
| 62-79217 | 4/1987 | Japan . |
| 62-238256 | 10/1987 | Japan . |
| 1-280413 | 11/1989 | Japan . |
| 2-52607 | 2/1990 | Japan . |
| 2-84421 | 3/1990 | Japan . |
| 2-175713 | 7/1990 | Japan . |
| 2-199111 | 8/1990 | Japan . |
| 2-163112 | 11/1990 | Japan . |
| 3-109412 | 5/1991 | Japan . |
| 3-185018 | 8/1991 | Japan . |
| 4-146916 | 5/1992 | Japan . |
| 5-84858 | 4/1993 | Japan . |
| 5-202161 | 8/1993 | Japan . |
| 5-209036 | 8/1993 | Japan . |
| 5-287047 | 11/1993 | Japan . |
| 6-41266 | 2/1994 | Japan . |
| 7-18045 | 1/1995 | Japan . |
| 7-67757 | 3/1995 | Japan . |
| 7-330850 | 12/1995 | Japan . |
| 8-193118 | 7/1996 | Japan . |
| 52-21097 | 2/1997 | Japan . |
| 10-181404 | 7/1998 | Japan . |
| 94/04586 | 3/1994 | WIPO . |

OTHER PUBLICATIONS

Database WPI, Section CH, Week 8804, Derwent Publications Ltd., London, GB; Class A25, AN 88–026350 XP002092227 & JP 62–288623 A (MD Kasei KK), Dec. 15, 1987.

*Primary Examiner*—John M. Cooney, Jr.
*Attorney, Agent, or Firm*—Wall Marjama Bilinski & Burr

[57] ABSTRACT

A soft polyurethane foam which has a rebound resilience percentage of not higher than 30% and whose temperature dependency of a compression force deflection that is represented by a difference between a 25%-compression force deflection value at −20° C. and a 25%-compression force deflection value at +20° C. is not larger than 0.030 kg/cm$^2$.

27 Claims, 4 Drawing Sheets

6,136,879

SOFT POLYURETHANE FOAM, METHOD OF PRODUCING THE SAME AND VEHICLE INTERIOR MEMBER USING THE SAME

The present application is based on Japanese Patent Applications Nos. 9-295713 filed Oct. 28, 1997, 10-224655 filed Aug. 7, 1998 and 10-286825 filed Oct. 8, 1998, the content of which is incorporated hereinto by reference.

BACKGROUND OF THE INVENTION

1. Field of the Invention

The present invention relates to a soft polyurethane foam suitably used as a material of interior members of automotive vehicles, and a method of production thereof. In particular, the invention is concerned with such a soft polyurethane foam used in the vehicle interior members such as an energy absorbing headrest capable of protecting a passenger of the vehicle from suffering from a whiplash injury, and a seat back of a vehicle seat exhibiting good energy absorbing properties. Further, the invention is concerned with methods of producing the soft polyurethane foam.

2. Discussion of the Related Art

A soft polyurethane foam has been widely used in vehicle interior members such as a seat cushion, a headrest, an instrument panel and a steering wheel, as well as furniture and bedding, taking advantage of its high rebound resilience property. The soft polyurethane foam is required to exhibit desired properties depending upon its applications. In particular, when the soft polyurethane foam is used in the vehicle headrest, it is required to exhibit high rebound resilience property and suitable hardness, so as to give a good feel to the vehicle passenger, in other words, good cushioning characteristics.

In recent years, the vehicle is equipped with various kinds of energy absorbing devices in an attempt to protect a passenger of the vehicle upon a vehicle collision accident. For instance, an air bag is installed in the steering wheel, instrument panel or doors. As disclosed in JP-A-8-193118, a rigid polyurethane foam is provided in the inside of the door, or in the side portion of the seat back adjacent to the door, for the purpose of absorbing the energy applied to the vehicle upon its collision, to thereby protect the loins, shoulders and abdomen of the passenger upon the collision.

In general, the rigid polyurethane foam does not restore its original shape once it is deformed by stresses applied thereto. Accordingly, the rigid polyurethane foam is used in limited portions of the vehicle. That is, the rigid polyurethane foam cannot be used as a material of the vehicle interior members such as the headrest, seat back, instrument panel, steering wheel, door trim and pillar, which members are frequently contacted by the vehicle passenger and subject to stresses due to the frequent contact.

JP-A-2-52607 and JP-A-1-280413 disclose a seat cushion having an improved comfort as felt by the passenger. The disclosed seat cushion is formed of a combination of a soft polyurethane foam of low rebound resilience whose percentage is not higher than 25% and a soft polyurethane foam of high rebound resilience whose percentage is not lower than 55%. JP-A-7-67757 discloses a pillow which uses as a core material a soft polyurethane foam having a rebound resilience percentage of not higher than 5%, to thereby keep the head of the user in a stable state while the user is sleeping. JP-A-2-175713 discloses a method of producing a soft polyurethane foam of low rebound resilience whose percentage is not higher than 25% by using a polyether polyol having an average molecular weight of 400–2000 and an average functionality of 2–3.5.

The vehicle interior members which use the soft polyurethane foam having the low rebound resilience property assure good energy absorbing characteristics as well as a good feel as given to the passengers. Since the soft polyurethane foam with the low rebound resilience property can restore its original shape after it has been subjected to compression deformation, the soft polyurethane foam can be suitably used in the interior members for the energy absorbing purpose, unlike the rigid polyurethane foam described above.

In the conventionally proposed soft polyurethane foam having the low rebound resilience property, however, the hardness of the resin which gives the soft polyurethane foam rapidly increases with a decrease in the temperature of the soft polyurethane foam. In this case, the soft polyurethane foam is too hard to exhibit its excellent properties. For instance, when the soft polyurethane foam with the low rebound resilience property is used as a pad material for the vehicle headrest, it is soft enough to assure a good feel at the room temperature of 10~30° C. In a cold condition at the temperature of 0~−20° C., however, the resin hardness of the soft polyurethane foam undesirably rises to a value as high as that of the rigid polyurethane foam, deteriorating the energy absorbing characteristics of the soft polyurethane foam. In this case, the soft polyurethane foam is not likely to restore its original shape immediately after it has been subjected to compression deformation, and the feel as given to the vehicle passenger is considerably deteriorated.

In an attempt to lower the rebound resilience percentage of the soft polyurethane foam for improving its energy absorbing characteristics, the soft polyurethane foam used in the vehicle interior member is formed by using a polyol material whose average molecular weight is relatively low. However, when the polyol material with the low average molecular weight is used in forming the soft polyurethane foam, it undesirably takes a lot of time for the reaction with a polyisocyanate component for forming the polyurethane. In this case, when the soft polyurethane foam is obtained by a foaming operation using a suitable mold, it requires a relatively long period of time before the formed polyurethane foam can be removed from the mold. In other words, it requires a relatively long period of time to completely cure the polyurethane foam, so that its production efficiency is deteriorated. Thus, the use of the polyol material with the low average molecular weight is not practically desirable.

It is well known to use a mono-ol or a monohydric alcohol in producing the polyurethane foam. For instance, JP-A-52-21097, JP-A-2-163112, JP-A-3-109412, JP-A-4-146916, JP-A-5-202161 and JP-A-5-287047 teach the use of the monohydric alcohol in the reaction system for forming the soft polyurethane foam, whereby the obtained soft polyurethane foam has a desired softness value and a reduced weight, without suffering from scorching. JP-A-60-177035, JP-A-3-185018 and JP-A-7-18045 disclose that the use of the monohydric alcohol prevents an increase of the viscosity of materials used for producing the polyurethane, so that the materials can be sufficiently blended. JP-A-56-36514, JP-A-60-219220, JP-A-62-238256, JP-A-2-199111 and JP-A-5-84858 disclose the use of the monohydric alcohol in an attempt to prevent shrinkage of the obtained polyurethane foam upon its removal from the mold, and improve its mechanical strength, storage stability and soundproof characteristics in a lower frequency range. None of those publications, however, teach a soft polyurethane foam which exhibits low rebound resilience characteristics both at the room temperature and under the cold condition while assuring an excellent feel as given to the user. Moreover, none of the publications suggest the use of such a soft polyurethane foam as an energy absorbing member.

SUMMARY OF THE INVENTION

It is therefore a first object of the present invention to provide a soft polyurethane foam which has a high degree of energy absorbing characteristics and assures a good feel as given to the user even when the temperature of the resin which gives the soft polyurethane foam is relatively low at the relatively low ambient temperature, and which soft polyurethane foam can be easily removed from a mold when it is formed by molding.

It is a second object of the invention to provide a method of producing such a soft polyurethane foam.

It is a third object of the invention to provide, by using such a soft polyurethane foam, a soft interior member for the vehicle, especially a vehicle headrest capable of protecting the passenger from suffering from a whiplash injury, and a seat back of a vehicle seat capable of absorbing energy so as to effectively support the back of the passenger.

As a result of an extensive study of the soft polyurethane foam by the inventors of the present invention, it was found that the feel or the cushioning characteristics of the polyurethane foam is affected by its temperature dependency of its hardness. It was further found that the temperature dependency of the hardness of the soft polyurethane foam relates to its temperature dependency of the compression force deflection when the polyurethane foam is compressed by 25%.

The above first object of the present invention may be attained according to a first aspect of the invention which provides a soft polyurethane foam which has a rebound resilience percentage of not higher than 30% and whose temperature dependency of compression force deflection represented by a difference between a 25%-compression force deflection value at −20° C. and a 25%-compression force deflection value at +20° C. is not larger than 0.030 kg/cm².

The soft polyurethane foam constructed according to the above first aspect of the present invention exhibits a high degree of energy absorbing characteristics owing to its rebound resilience percentage of not higher than 30%. In the present soft polyurethane foam wherein the temperature dependency of the compression force deflection is not larger than 0.030 kg/cm², the dependency of its hardness on a change of the ambient temperature is significantly reduced, whereby a difference between the hardness values of the resin of the soft polyurethane foam at the room temperature and under the cold condition is accordingly reduced. According to this arrangement, the soft polyurethane foam exhibits its excellent properties without suffering from deterioration of its feel as given to the user even when the temperature of the resin is relatively low.

In a first preferred form of the above first aspect of the invention, both of the 25%-compression force deflection value at −20° C. and the 25%-compression force deflection value at +20° C. are not larger than 0.110 kg/cm². According to this arrangement, the soft polyurethane foam advantageously assures excellent feel under the cold condition as well as at the room temperature.

In a second preferred form of the above first aspect of the invention, the soft polyurethane foam is produced by reaction of a polyol component having an average molecular weight of 2000–8000 and an organic polyisocyanate, in the presence of a monohydric alcohol having a molecular weight of not larger than 100.

The inventors of the present invention found that the presence of the selected monohydric alcohol in the reaction system of the polyol component and the organic polyisocyanate is effective to lower the rebound resilience percentage of the obtained soft polyurethane foam. Owing to the inclusion of the monohydric alcohol, the obtained polyurethane foam has the rebound resilience percentage of not higher than 30% even when the polyol component having a high average molecular weight is used.

According to the above second preferred form of the first aspect of the present invention, the soft polyurethane foam has the rebound resilience percentage of not higher than 30%, and exhibits a high degree of energy absorbing characteristics. In this arrangement, the soft polyurethane foam has such a low rebound resilience percentage owing to the presence of the monohydric alcohol in the polyurethane-forming reaction which uses the polyol material (component) having a high average molecular weight. Accordingly, the hardness of the resin that gives the soft polyurethane foam is not largely dependent on a change of the ambient temperature, so that a difference between the resin hardness values at the room temperature and under the cold condition is reduced. In this case, the soft polyurethane foam is capable of exhibiting its excellent properties without suffering from deterioration of its feel as given to the user even when the resin temperature is lowered with a decrease in the ambient temperature. In addition, the use of the polyol component having a high average molecular weight is effective to reduce a time required time for curing the polyurethane foam, and to assure easy removal of the obtained polyurethane foam from the mold, resulting in the improvement of its productivity.

In a third preferred form of the above first aspect of the present invention, the soft polyurethane foam is produced by reaction of a polyol component and an organic polyisocyanate, wherein the -polyol component comprises polyoxyalkylene polyol having an average functionality of 2–8 and a hydroxyl equivalent of 900–3300, and the reaction is effected in the presence of a compound represented by the following formula (1), in an amount of 0.005–0.1 mol per 100 g of the polyol component,

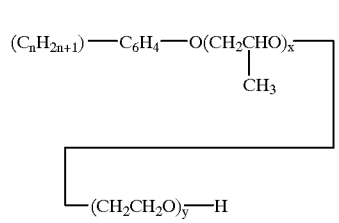

wherein, n is an integer of 0–20, x and y represent respective different ones of integers 0–20, and a sum of x and y is in a range of 0–20.

The inventors of the present invention found that the feel of the soft polyurethane foam varies depending upon the temperature dependency of its hardness, and that the temperature dependency of the hardness relates to the temperature dependency of the compression force deflection obtained on the basis of the 25%-compression force deflection values. Further, it was found that the desired soft polyurethane foam is obtained by the polyurethane-forming reaction which uses the predetermined polyol component in the presence of the selected mono-ol compound.

The soft polyurethane foam produced according to the above third preferred form of the first aspect of the present invention has the rebound resilience percentage of not higher than 30% owing to the combined use of the polyol component and the mono-ol compound, whereby the obtained soft polyurethane foam exhibits a high degree of energy absorbing characteristics. Further, since the present soft polyurethane foam has the temperature dependency of the compression force deflection of not larger than 0.030 kg/cm$^2$, its hardness is not siginificantly dependent on a change of the ambient temperature, whereby a difference between the resin hardness values at the room temperature and under the cold condition is appreciably reduced. Accordingly, the present soft polyurethane foam does not suffer from deterioration of its feel even when the resin temperature is lowered as the ambient temperature is lowered.

In a fourth preferred form of the above first aspect of the present invention, n is an integer of 0–9, x and y represent respective different ones of integers 0–10, and a sum of x and y is in a range of 0–10.

In a fifth preferred form of the above first aspect of the present invention, the compound represented by the above formula (1) is nonyl phenol or a substance obtained by addition polymerization of 1–10 mol of ethylene oxide to the nonyl phenol.

The above second object of the present invention may be attained according to a second aspect of the invention, which provides a method of producing a soft polyurethane foam by reacting an active hydrogen compound with an organic polyisocyanate using water, wherein the active hydrogen compound is a mixture of polyether triol having a hydroxyl equivalent of 900–1500 and containing 5–30 wt. % of terminal polyoxy ethylene units, and polyether diol having a hydroxyl equivalent of 1010–1500 and containing 5–30 wt. % of terminal polyoxy ethylene units, a weight ratio of the polyether triol to the polyether diol being in a range of 80/20~0/100, and the water is used in an amount of 2.0–6.0 parts by weight per 100 parts by weight of the active hydrogen compound.

In a first preferred form of the above second aspect of the present invention, the organic polyisocyanate is a mixture of polymethylene polyphenylisocyanate and 2,4-tolylenediisocyanate and/or 2,6-tolylenediisocyanate, a weight ratio of the polymethylene polyphenylisocyanate to the 2,4-tolylenediisocyanate and/or 2,6-tolylenediisocyanate being in a range of 100/0~70/30.

In a second preferred form of the above second aspect of the present invention, the organic polyisocyanate is a prepolymer having terminal isocyanate groups, the prepolymer being obtained by reacting polymethylene polyphenylisocyanate with at least one polyether polyol which has an average functionality of 1–4 and a hydroxyl equivalent of 800–2000 and which is obtained by addition polymerization of alkylene oxide having three or more carbon atoms, and ethylene oxide, in a molar ratio of 20/80~100/0.

In a third preferred form of the above second aspect of the present invention, the polyether triol and the polyether diol are mixed in a weight ratio of 70/30~40/60.

The above second object of the present invention may be also attained according to a third aspect of the invention, which provides a method of producing a soft polyurethane foam having a rebound resilience percentage of not higher than 30%, by reaction of a polyol component having an average molecular weight of 2000–8000 with an organic polyisocyanate in the presence of water, wherein the reaction is effected in the presence of a monohydric alcohol having a molecular weight of not larger than 100.

In a first preferred form of the above third aspect of the invention, the monohydric alcohol is used in an amount of 0.1–15 parts by weight per 100 parts by weight of the polyol component.

In a second preferred form of the above third aspect of the invention, the monohydric alcohol is used in an amount of 0.5–5 parts by weight per 100 parts by weight of the polyol component.

In a third preferred form of the above third aspect of the invention, the polyol component contains 30–70 wt. % of a polymer polyol. Alternatively, a polyether polyol and/or a polyester polyol, and the polymer polyol are mixed in a weight ratio of 30/70~70/30, so as to provide the polyol component.

In a fourth preferred form of the above third aspect of the invention, the polyol component has an average molecular weight of 3000–6000. According to this arrangement, the soft polyurethane foam to be obtained has the desired low rebound resilience percentage and the desired temperature dependency of its hardness while assuring easy removal thereof from the mold.

The above second object of the present invention may be also attained according to a fourth aspect of the invention, which provides a method of producing a soft polyurethane foam by reaction of an organic polyisocyanate and a mixture of a polyol component and water, the soft polyurethane foam having a rebound resilience percentage of not higher than 30%, and temperature dependency of compression force deflection represented by a difference between a 25%-compression force deflection value at −20° C. and a 25%-compression force deflection value at +20° C. being not larger than 0.030 kg/cm$^2$, wherein the polyol component comprises polyoxyalkylene polyol having an average functionality of 2–8 and a hydroxyl equivalent of 900–3300, and the reaction is effected in the presence of a compound represented by the following formula (1), in an amount of 0.005–0.1 mol per 100 g of the polyol component,

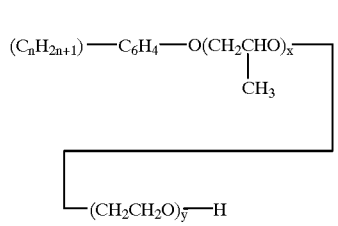

(1)

wherein, n is an integer of 0–20, x and y represent respective different ones of integers 0–20, and a sum of x and y is in a range of 0–20.

In a first preferred form of the above fourth aspect of the present invention, n is an integer of 0–9, x and y represent respective different ones of integers 0–10, and a sum of x and y is in a range of 0–10.

In a second preferred form of the above fourth aspect of the present invention, the compound represented by the above formula is nonyl phenol or a substance obtained by addition polymerization of 1–10 mol of ethylene oxide to the nonyl phenol.

In a fourth preferred form of the above fourth aspect of the present invention, both of the 25%-compression force deflection value at −20° C. and the 25%-compression force deflection value at +20° C. are not larger than 0.110 kg/cm$^2$.

The above third object of the present invention may be attained according to a fifth aspect of the invention, which provides a vehicle interior member comprising a skin layer, and a pad layer covered by the skin layer so as to absorb external energy applied to the vehicle interior member, wherein at least a portion of the pad layer is formed of a soft polyurethane foam which has a rebound resilience percentage of not higher than 30% and whose temperature dependency of compression force deflection represented by a difference between a 25%-compression force deflection value at −20° C. and a 25%-compression force deflection value at +20° C. is not larger than 0.030 kg/cm$^2$.

The vehicle interior member constructed according to the above fifth aspect of the present invention exhibits a high degree of energy absorbing characteristics while assuring a good feel as given to the user.

In a first preferred form of the above fifth aspect of the present invention, both of the 25%-compression force deflection value at −20° C. and the 25%-compression force deflection value at +20° C. are not larger than 0.110 kg/cm$^2$.

In a second preferred form of the above fifth aspect of the present invention, the vehicle interior member is a headrest comprising a bag-like skin member as the skin layer, the skin member having an inside space, a pad material as the pad layer, the pad material filling the inside space of the skin member, and a core member having an inner portion fixed within the pad material and an outer portion projecting from a surface of the skin member, wherein at least a portion of the pad material is formed of the soft polyurethane foam.

The headrest constructed according to the above second preferred form effectively absorbs a shock when the passenger hits the head against the headrest in the event of a rear-end collision of the vehicle, so as to protect the passenger from a whiplash injury.

In a third preferred form of the above fifth aspect of the present invention, the vehicle interior member is a seat back comprising a seat back cover as the skin layer, a seat back frame, and a seat back pad as the pad layer, the seat back pad being interposed between the seat back cover and the seat back frame, wherein at least a portion of the seat back pad is formed of the soft polyurethane foam.

In a fourth preferred form of the above fifth aspect of the present invention, the soft polyurethane foam is produced by reaction of a polyol component having an average molecular weight of 2000–8000 and an organic polyisocyanate, in the presence of a monohydric alcohol having a molecular weight of not larger than 100.

In a fifth preferred form of the above fifth aspect of the present invention, the polyurethane foam is produced by reaction of a polyol component with an organic polyisocyanate, wherein the polyol component comprises polyoxyalkylene polyol having an average functionality of 2–8 and a hydroxyl equivalent of 900–3300, and the reaction is effected in the presence of a compound represented by the following formula (1), in an amount of 0.005–0.1 mol per 100 g of the polyol component,

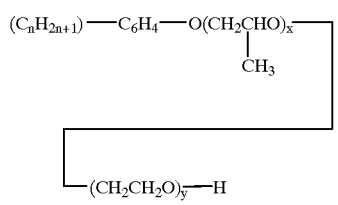

(1)

wherein, n is an integer of 0–20, x and y represent respective different ones of integers 0–20, and a sum of x and y is in a range of 0–20.

In a sixth preferred form of the above fifth aspect of the present invention, n is an integer of 0–9, x and y represent respective different ones of integers 0–10, and a sum of x and y is in a range of 0–10.

In a seventh preferred form of the above fifth aspect of the present invention, the compound represented by the above formula is nonyl phenol or a substance obtained by addition polymerization of 1–10 mol of ethylene oxide to the nonyl phenol.

DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which.

DETAILED DESCRIPTION OF THE PREFERRED EMBODIMENTS

Figure 1:
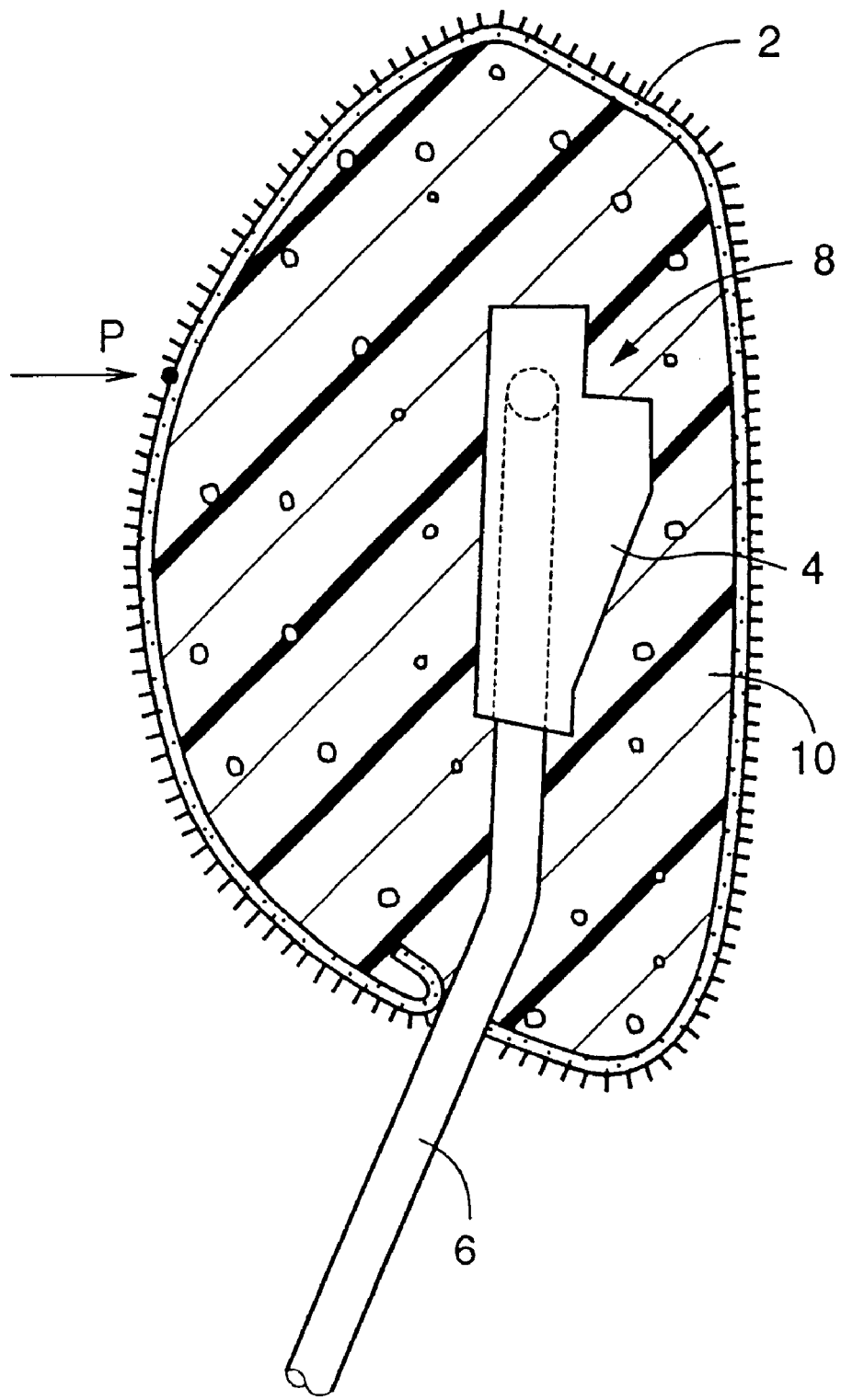
FIG. 1 is a longitudinal cross sectional view of a headrest as one example of a vehicle interior member constructed according to the present invention.

The soft polyurethane foam according to the present invention has flexibility that permits free deformation thereof upon receiving a load, and restores its original shape upon removal of the load therefrom. The present soft polyurethane foam has a rebound resilience percentage of not higher than 30%, preferably not higher than 25%, so that the soft polyurethane foam exhibits a high degree of energy absorbing characteristics. The rebound resilience percentage is measured in accordance with a method A specified in section "9. Rebound resilience" of JIS-K 6400 (1997). If the rebound resilience percentage exceeds 30%, the soft polyurethane foam does not exhibit sufficient energy absorbing characteristics.

The soft polyurethane foam according to the present invention has temperature dependency of compression force deflection of not larger than 0.030 kg/cm$^2$. Described in detail, the temperature dependency of the compression force deflection is represented by a difference between a 25%-compression force deflection value at −20° C. and a 25%-compression force deflection value at +20° .C [Δ25%CFD=(25%-compression force deflection value at −20° C.)−(25%-compression force deflection value at +20° C.)]. According to this arrangement, the hardness of the soft polyurethane foam is not significantly dependent on a change of the ambient temperature. Accordingly, even when the temperature of the resin that gives the soft polyurethane foam is comparatively low at a comparatively low ambient temperature, the soft polyurethane foam does not suffer from deterioration of its feel as given to the user.

The above-described feel of the polyurethane foam is evaluated by a sensory test, in which the polyurethane foam is examined of its shape restoring characteristic after it is compressed with a predetermined force. Namely, the polyurethane foam has a good feel if it restores its original shape immediately after removal of the compressive force, while the polyurethane foam has a bad feel if it restores its original shape a long time after the removal of the compressive force. The above-described 25%-compression force deflection values of the polyurethane foam are measured according to ASTM-D-3574 at predetermined temperature values, i.e., at −20° C. and +20° C., respectively. In general, it takes a relatively long period of time for the polyurethane foam to restore its original shape when it receives a load at a relatively low temperature. The polyurethane foam is compressed by 25% at −20° C. and at +20° C., respectively. Namely, the 25%-compression force deflection values are obtained by compression to reduce the initial height of the polyurethane foam by 25%. On the basis of the 25%-compression force deflection values obtained as described above, the temperature dependency of the compression force deflection ($\Delta 25\%$CFD) is obtained. If the temperature dependency of the compression force deflection exceeds 0.030 kg/cm$^2$, the feel of the polyurethane foam deteriorates due to a rapid increase of its hardness when the resin temperature of the polyurethane foam is relatively low. In view of this, the temperature dependency of the compression force deflection ($\Delta 25\%$CFD) needs to be not larger than 0.030 kg/cm$^2$, preferably not larger than 0.020 kg/cm$^2$.

In the present soft polyurethane foam, both of the 25%-compression force deflection value at −20° C. and the 25%-compression force deflection value at +25° C. are not larger than 0.110 kg/cm$^2$, preferably in the range of 0.020–0.080 kg/cm$^2$, more preferably in the range of 0.030–0.070 kg/cm$^2$, still more preferably in the range of 0.040–0.070 kg/cm$^2$, whereby the soft polyurethane foam can exhibit its excellent properties to a satisfactory extent. If the 25%-compression force deflection values at −20° C. and +20° C. exceed 0.110 kg/cm$^2$, the hardness of the soft polyurethane foam increases to a great extent, whereby the feel of the cushioning characteristics of the soft polyurethane foam is considerably deteriorated.

The soft polyurethane foam having the rebound resilience percentage and temperature dependency of the compression force deflection ($\Delta 25\%$CFD) as specified above is used as a material for vehicle interior members such as a steering wheel, an instrument panel, a seat cushion, a seat back, a door trim, a pillar, a knee pad and a headrest. The vehicle interior members formed of the present soft polyurethane foam exhibit a high degree of energy absorbing characteristics and assure a good feel as felt by the vehicle passenger. Described in detail, the vehicle interior members generally include a skin layer, a frame member or a core member, and a pad layer which is interposed therebetween and which absorbs external energy applied to the interior members. In the present invention, at least a portion of the pad layer is formed of the soft polyurethane foam having the rebound resilience percentage and temperature dependency of the compression force deflection ($\Delta 25\%$CFD) as specified above.

For instance, the present soft polyurethane foam is used in a headrest as one example of the vehicle interior members. Referring to FIG. 1, there is shown such a headrest including a bag-like skin member 2 (as the skin layer) having an inside space, a pad material 10 (as the pad layer) filling the inside space of the skin member 2, and a core member 8 having an insert 4 fixed within the pad material 10 and a stay 6 fixed to the insert 4 and projecting from the surface of the skin member 2. In this headrest, at least a portion of the pad material 10 is formed of the soft polyurethane foam according to the present invention. The headrest is attached to a seat back of a vehicle seat such that the stay 6 is fixed to the upper portion of the seat back, so that the headrest absorbs a shock generated upon hitting of the head of the vehicle passenger against the headrest in a direction indicated by an arrow in FIG. 1. Accordingly, in a collision or crash accident of the vehicle, the shock generated upon hitting of the head against the headrest in the direction indicated by the arrow is effectively absorbed by the soft polyurethane foam which at least partially forms the pad material 10 of the headrest. Accordingly, the vehicle passenger is protected from suffering from a whiplash injury.

Figure 2:
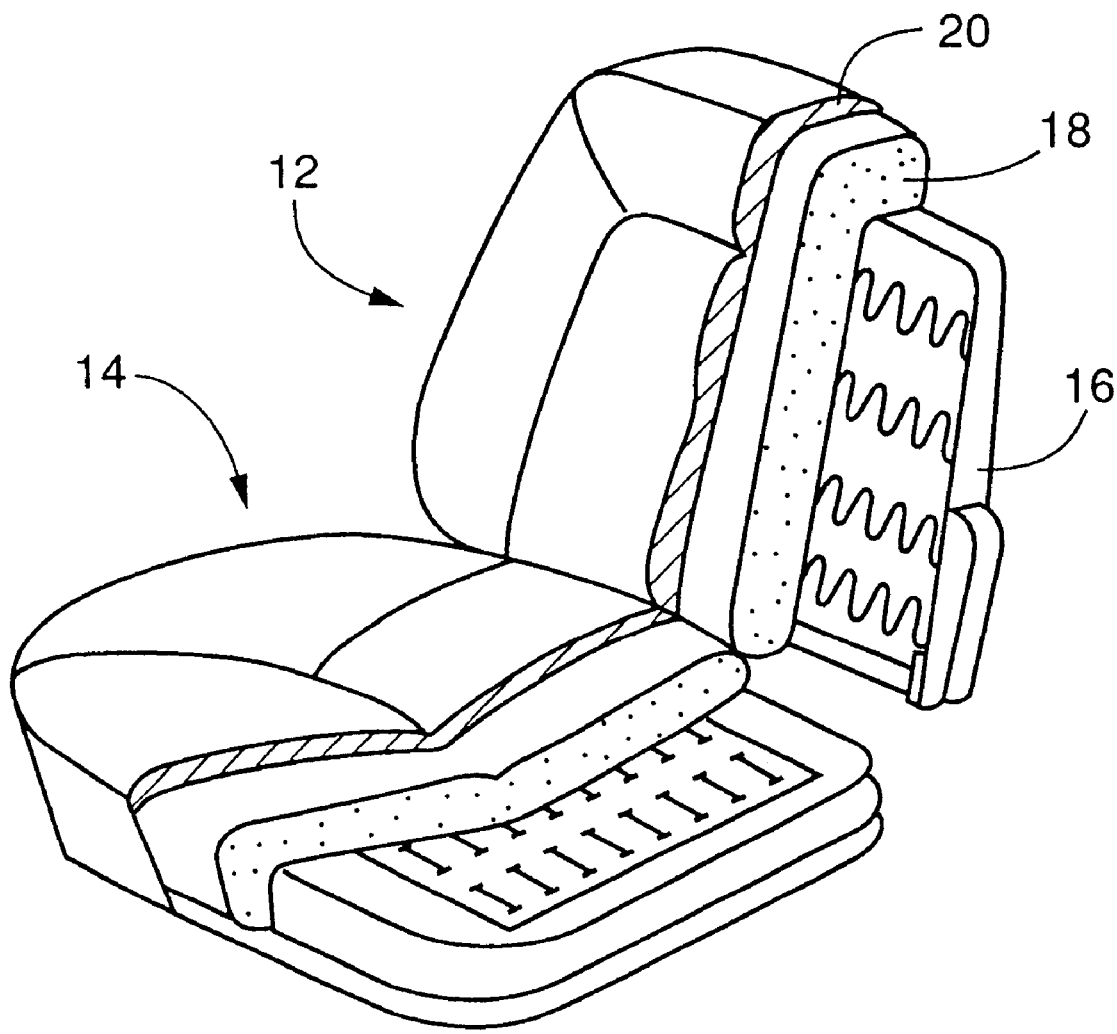
FIG. 2 is an elevational view, partly in section of a seat back as another example of the vehicle interior member constructed according to the present invention.

Referring next to FIG. 2, there is shown a seat back 12 of a vehicle seat as another example of the vehicle interior members, in which the present soft polyurethane foam is used. Described in detail, the vehicle seat shown in FIG. 2 consists of the seat back 12 which supports the back of the passenger, and a seat cushion 14 which supports the buttocks. The seat back 12 includes a seat back frame 16, a seat back pad 18 as the pad layer, and a seat back cover 20 (as the skin layer) covering the seat back pad 18. In the present invention, at least a portion of the seat back pad 18 is formed of the soft polyurethane foam having the rebound resilience percentage and temperature dependency of the compression force deflection as specified above, whereby the seat back 12 exhibits excellent energy absorbing characteristics, and assures a good feel or good cushioning characteristics.

According to a first embodiment of the present invention, the soft polyurethane foam having the excellent properties as described above is formed by reaction of an active hydrogen compound and an organic polyisocyanate, in the presence of water. As the active hydrogen compound, a polyether triol having a hydroxyl equivalent of 900–1500 and containing 5–30 wt. % of terminal polyoxyethylene units connected to its ends by addition polymerization of ethylene oxide, and a polyether diol having a hydroxyl equivalent of 1010–1500 and containing 5–30 wt. % of terminal polyoxyethylene units connected to its ends by addition polymerization of ethylene oxide are mixed in a weight ratio of 80/20–0/100.

Described more specifically, the polyether triol is obtained by addition polymerization of at least one kind of alkylene oxide to a starting material having a functionality of 3, such that the polyether triol to be obtained has the hydroxyl equivalent of 900–1500, and such that the content of the terminal polyoxyethylene units connected to the molecule ends of the polyether triol among all alkylene oxide units connected to the starter by the addition polymerization is 5–30 wt. %. The polyether diol is obtained by addition polymerization of at least one kind of alkylene oxide to a starting material having a functionality of 2 and, such that the polyether diol to be obtained has a hydroxyl equivalent of 1010–1500, and such that the content of the terminal polyoxyethylene units connected to the molecule ends of the polyether diol among all alkylene oxide units connected to the starting material by the addition polymerization is 5–30 wt. %. The hydroxyl equivalent is obtained by dividing the molecular weight of the active hydrogen compound by the functionality of the starting material.

As the starting material having the functionality of 3 that gives the polyether triol described above, trihydroxy compounds such as glycerin and trimethylolpropane or alcanol amines such as triethanol amine and diethanol amine are used. As the starting material having the functionality 2 that gives the polyether diol described above, dihydroxy compounds such as ethylene glycol and diethylene glycol or aromatic compounds such as aniline and bisphenol A are used. Examples of the alkylene oxide connected to these starting materials by the addition polymerization include ethylene oxide and propylene oxide.

The polyether triol and the polyether diol described above have the terminal polyoxyethylene units in their molecule ends, for promoting the reaction thereof with the organic polyisocyanate. The content of the terminal polyoxyethylene units is in the range of 5–30 wt. %. The content of the terminal polyoxyethylene units smaller than 5 wt. % lowers the reactivity of the reaction mixture, and therefore it requires a relatively long period of time before the reaction is completed, i.e., before the obtained soft polyurethane foam is completely cured. On the other hand, the content of the terminal polyoxyethylene units exceeding 30 wt. % accelerates the reaction to an undesirable extent, causing shrinkage of the obtained soft polyurethane foam.

When the hydroxyl equivalents of the polyether triol and the polyether diol used as the active hydrogen compound exceed the upper limit, i.e., 1500, the rebound resilience percentage of the soft polyurethane foam to be obtained tends to be high, deteriorating its energy absorbing characteristics. On the other hand, when the hydroxyl equivalents of the polyether triol and the polyether dial are below the respective lower limits, i.e., 900 and 1010, the soft polyurethane foam to be obtained undesirably has large temperature dependency of the compression force deflection ($\Delta 25\%$CFD). In view of this, the hydroxyl equivalents of the polyether trial and the polyether diol need to be held in the range of 900–1500 and in the range of 1010–1500, respectively.

As the active hydrogen compound of the present embodiment, a so-called polymer polyol is suitably used. As well known, the polymer polyol is obtained by polymerization of a suitable ethylenically unsaturated compound in a polyol such as polyether trial and polyether diol. As the ethylenically unsaturated compound for preparing the polymer polyol, it is preferable to use acrylonitrile, styrene, 1,2-polybutadiene polyol or 1,4-polybutadiene polyol.

Except when the polyether dial is used alone, the polyether trial and the polyether dial are used in combination in a weight ratio of 80/20~0/100, preferably 70/30~40/60. If the weight ratio of the polyether trial to the polyether diol is larger than 80/20, in other words, if the amount of the polyether triol with respect to that of the polyether dial is too large, the rebound resilience percentage of the soft polyurethane foam to be obtained tends to be high, deteriorating its energy absorbing characteristics.

As the organic polyisocyanate to be reacted with the active hydrogen compound formed of the polyether triol and the polyether diol described above for forming the polyurethane, any known organic polyisocyanates are suitably used. In the present embodiment, it is preferable to use polymethylene polyphenylisocyanate or 2,4-tolylenediisocyanate (2,4-TDI) and/or 2,6-tolylenediisocyanate (2,6-TDI). The polymethylene polyphenylisocyanate is a mixture of crude MDI (diphenylmethane diisocyanate) and purified MDI in a weight ratio of 100/0~15/85. The crude MDI contains 40–50 wt. % of 4,4'-MDI, 0–10 wt. % of 2,4'-MDI, 0–2 wt. % of 2,2'-MDI, and 50–60 wt. % of methylene-crosslinked polyphenylpolyisocyanate having three or more benzene nuclei, while the purified MDI contains 0–50 wt. % of an isomer mixture consisting of 2,2'-MDI and 2,4'-MDI, and 50–100 wt. % of 4,4'-MDI. In the 2,4-TDI and/or 2,6-TDI, though the ratio of the amounts of the two isomers, i.e., the ratio of the amount of 2,4-TDI to the amount of 2,6,-TDI does not significantly influence the effect of the present embodiment, the ratio is preferably held within the range of 100/0~65/35.

In the present embodiment, only one of the polymethylene polyphenylisocyanate and the 2,4-TDI and/or 2,6-TDI may be used as the organic polyisocyanate to be reacted with the active hydrogen compound. Alternatively, the polymethylene polyphenylisocyanate and the 2,4-TDI and/or 2,6-TDI may be used in combination, in a weight ratio of 100/0~70/30. If the amount of the 2,4-TDI and/or 2,6-TDI is too large with respect to the amount of the polymethylene polyphenylisocyanate, in other words, if the weight ratio of the polymethylene polyphenylisocyanate to the 2,4-TDI and/or 2,6-TDI is smaller than 70/30, the rebound resilience percentage and the temperature dependency of the compression force deflection ($\Delta 25\%$CFD) of the obtained soft polyurethane foam tend to slightly increase.

In the present embodiment, it is preferable to use as the organic polyisocyanate a prepolymer having terminal isocyanate groups in its ends. This prepolymer is obtained by reacting the polymethylene polyphenylisocyanate with at least one polyether polyol for modifying isocyanate, which at least one polyether polyol has an average functionality of 1–4 and a hydroxyl equivalent of 800–2000 and is formed by addition polymerization of alkylene oxide having three or more carbon atoms, and ethylene oxide, in a molar ratio of 20/80~100/0, to a starting material. Such a prepolymer has an NCO content of 10–30%, preferably 20–30%. As specified above, the hydroxyl equivalent is obtained by dividing the molecular weight of the isocyanate-modifying polyether polyol by the functionality of the starting material. The average functionality means the functionality of the starting material.

The starting material to which the predetermined alkylene oxide and ethylene oxide are connected by the addition polymerization so as to give the above-described isocyanate-modifying polyether polyol is suitably selected from among any known starting materials having a functionality of 1–4. Examples of such starting materials include methanol, ethanol, ethylene glycol, diethylene glycol, glycerin, trimethylolpropane, diglycerin, polyethanolamine and pentaerythritol. Two or more of these starting materials may be used in combination. As the alkylene oxide connected to the starting material by the addition polymerization, propylene oxide, ethylene oxide, butylene oxide and styrene oxide are used, for example. The addition polymerization is effected in a block or random manner, wherein the molar ratio of the alkylene oxide having three or more carbon atoms to the ethylene oxide is held in the range of 20/80~100/0.

If the molar amount of the ethylene oxide in the addition polymerization for forming the isocyanate-modifying polyether polyol is too large with respect to the molar amount of the alkylene oxide with three or more carbon atoms, in other words, if the molar ratio of the alkylene oxide to the ethylene oxide is smaller than 20/80, the stability of the organic polyisocyanate is considerably deteriorated, resulting in deposition thereof within several hours at the room temperature. If the hydroxyl equivalent of the isocyanate-modifying polyether polyol is smaller than 800, the obtained soft polyurethane foam suffers from undesirably large temperature dependency of the compression force deflection ($\Delta 25\%$CFD). On the other hand, if the isocyanate-modifying polyether polyol has the hydroxyl equivalent exceeding 2000 and the average functionality larger than 4, the rebound resilience percentage of the obtained soft polyurethane foam tends to be undesirably high, deteriorating its energy absorbing characteristics.

According to a second embodiment of the present invention, the soft polyurethane foam having the rebound resilience percentage of not higher than 30% is produced by reaction of a polyol component having an average molecular weight of 2000–8000, preferably 3000–6000, and an organic polyisocyanate in the presence of water, wherein the reaction is effected in the presence of a monohydric alcohol having a molecular weight of not larger than 100.

In the polyurethane-forming reaction according to this second embodiment, the organic polyisocyanates described with respect to the preceding first embodiment may be used. Examples of the organic polyisocyanate include tolylene diisocyanate, phenylene diisocyanate, xylylene diisocyanate, diphenylmethane diisocyanate, triphenylmethane triisocyanate, polymethylene polyphenylisocyanate, naphthalene diisocyanate, and derivatives thereof (e.g., prepolymers obtained by reaction with the polyols, and modified polyisocyanates). In the present embodiment, the polymethylene polyphenylisocyanate and the tolylene diisocyanate are preferably used as the organic polyisocyanate.

As the polyol component to be reacted with the polyisocyanate for producing the polyurethane, any one of, or any combination of, various polyols such as polyvalent hydroxy compounds, polyether polyols and polyester polyols is used. In the present embodiment, the polyol component having an average molecular weight in the range of 2000–8000, preferably in the range of 3000–6000 is preferably used. If the average molecular weight of the polyol component to be used is smaller than 2000, the feel of the obtained polyurethane foam is deteriorated and its rebound resilience percentage is too low. In addition, the curing of the polyurethane foam tends to be insufficient. On the other hand, if the average molecular weight of the polyol component is larger than 8000, the rebound resilience percentage tends to be too high, whereby the obtained soft polyurethane foam does not have the desired rebound resilience percentage of not higher than 30%. When a plurality of polyols are used in combination as the polyol component, the average molecular weight of the polyol component is calculated on the basis of number average molecular weights and contents of the respective polyols.

In the present embodiment, the polyol component may be a combination of at least one polyol and a polymer polyol. Owing to the inclusion of the polymer polyol in the polyol component, the average molecular weight of the polyol component is increased as a whole. According to the present embodiment, the polyurethane foam to be obtained has a relatively low rebound resilience percentage even when the polyol component having a high average molecular weight is used. The increase in the average molecular weight of the polyol component is effective to improve the temperature dependency of the compression force deflection of the polyurethane foam to be obtained, and reduce the required time for curing the polyurethane foam, thereby enhancing its productivity.

As described in the preceding first embodiment, the polymer polyol to be contained in the polyol component is obtained by polymerizing a suitable ethylenically unsaturated compound in the polyols such as polyether polyol and polyester polyol.

The polymer polyol is contained in the polyol component in an amount of 30–70 wt. %, preferably 40–60 wt. %. The amount of the polymer polyol exceeding 70 wt. % deteriorates the feel or cushioning characteristics of the obtained polyurethane foam. In this case, the polyurethane foam is not likely to restore its original shape immediately after it has been deformed by a compression force. On the other hand, the amount of the polymer polyol smaller than 30 wt. % does not permit a sufficient increase in the average molecular weight of the polyol component for providing the polyurethane foam having the desired low rebound resilience percentage, whereby the temperature dependency of the compression force deflection of the obtained polyurethane foam is not improved to a satisfactory extent. Further, it requires a relatively long period of time for the polyurethane foam to be completely cured.

As the at least one polyol to be used in combination with the polymer polyol, at least one of polyether polyol and polyester polyol is preferably used. The polyether polyol used in the present embodiment is obtained, for example, by addition-polymerizing at least one of ethylene oxide, propylene oxide, butylene oxide, tetrahydrofuran, and styrene oxide, to polyvalent hydroxy compounds, polyamines or alkanolamines. The polyester polyol used in the present embodiment is obtained, for example, by reacting at least one compound having at least two hydroxyl groups such as ethylene glycol or propylene glycol, with at least one compound having at least two carboxyl groups such as malonic acid, maleic acid, succinic acid, adipic acid or phthalic acid.

In forming the polyurethane according to the present embodiment, the reaction of the polyol component having an average molecular weight of 2000–8000 and the organic polyisocyanate is effected in the presence of a monohydric alcohol having a molecular weight of not larger than 100, whereby the desired soft polyurethane foam having a low rebound resilience percentage can be advantageously obtained even when the polyol component with a high molecular weight is used.

The monohydric alcohol used in the present embodiment needs to have a molecular weight of not larger than 100, and is suitably selected from among methanol, ethanol, propanol, isopropanol, butanol, isobutanol, pentanol, and isopentanol, for instance. It is preferable to use the monohydric alcohol having a molecular weight of not larger than 74. If the molecular weight of the monohydric alcohol exceeds 100, the obtained polyurethane foam does not have a sufficiently lowered rebound resilience percentage.

The amount of the monohydric alcohol to be present in the reaction system is suitably determined depending upon the average molecular weight of the polyol component. In general, the monohydric alcohol is used in an amount of 0.1–15 parts by weight, preferably 0.5–5 parts by weight, per 100 parts by weight of the polyol component. If the amount of the monohydric alcohol is smaller than the above lower limit, the advantages to be provided by the addition of the monohydric alcohol are not obtained. On the contrary, the excessive amount of the monohydric alcohol undesirably delays the reaction for forming the polyurethane, resulting in a longer curing time and lowered production efficiency of the polyurethane foam. Moreover, the temperature dependency of the compression force deflection of the obtained polyurethane foam is adversely influenced.

According to a third embodiment of the present invention, the soft polyurethane foam which has the rebound resilience percentage of not higher than 30% and whose temperature dependency of the compression force deflection (Δ25%CFD) is not larger than 0.030 kg/cm² is obtained by reaction of an organic polyisocyanate and a mixture of a polyol component and water, wherein the polyol component comprises polyoxyalkylene polyol having an average functionality of 2–8 and a hydroxyl equivalent of 900–3300, and the reaction is effected in the presence of a compound represented by the following formula (1), in an amount of 0.005–1 mol per 100 g of the polyol component,

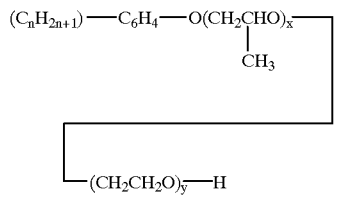

(1)

wherein, n is an integer of 0–20, x and y represent respective different ones of integers 0–20, and a sum of x and y is in the range of 0–20.

Described more specifically, the polyoxyalkylene polyol advantageously used as the polyol component in the present embodiment is obtained by addition polymerization of alkylene oxide such as ethylene oxide or propylene oxide to a starting material such as water, dipropylene glycol, glycerin, trimethylol propane, diglycerin, pentaerythritol, sorbitol or sugar. The polyoxyalkylene polyol has an average functionality of 2–8 and a hydroxyl equivalent of 900–3300. If the average functionality of the polyoxyalkylene polyol to be used is smaller than 2, the reaction with the organic polyisocyanate does not proceed to a sufficient extent to provide a satisfactory polyurethane resin, resulting in deterioration of its productivity. On the other hand, the average functionality larger than 8 causes shrinkage of the soft polyurethane foam which is demolded after the foaming reaction. Although the hydroxyl equivalent smaller than 900 results in a lowered rebound resilience percentage of the soft polyurethane foam to be obtained, the temperature dependency of the compression force deflection (Δ25%CFD) of the polyurethane foam undesirably tends to be large when the hydroxyl equivalent is smaller than 900. The hydroxyl equivalent larger than 3300 increases the viscosity of the polyol, making its handling difficult.

In the present embodiment, a so-called polymer polyol may be used, as the polyol component, in combination with the polyoxyalkylene polyol described above. As described in the preceding first and second embodiments, the polymer polyol is obtained by polymerizing an ethylenically unsaturated compound such as acrylonitrile or styrene in the polyoxyalkylene polyol. The polymer polyol is used in an amount of 0–60 parts by weight per 100 parts by weight of the polyol component. If the amount of the polymer polyol is excessive, the temperature dependency of the compression force deflection (Δ25%CFD) of the obtained soft polyurethane foam tends to be large. Besides the above-described polymer polyol which is used together with the polyoxyalkylene polyol, a known polyol compound such as polyester polyol and a ring-opening polymerization product of tetrahydrofuran may be used.

As the organic polyisocyanate to be reacted with the polyol component described above for forming the polyurethane in this third embodiment, the organic polyisocyanates described with respect to the preceding first and second embodiments may be used. Examples of the organic polyisocyanate include tolylene diisocyanate, phenylene diisocyanate, xylylene diisocyanate, diphenylmethane diisocyanate, triphenylmethane triisocyanate, polymethylene polyphenyl polyisocyanate, naphthalene diisocyanate and derivatives thereof (e.g., prepolymers obtained by reaction with polyols, and modified polyisocyanates). In the present embodiment, it is preferable to use polymethylene polyphenyl polyisocyanate as the organic polyisocyanate. Further, 4,4'-diphenylmethane diisocyanate or 2,4'-diphenylmethane diisocyante, or mixture thereof (purified MDI) and polymeric MDI (crude MDI) are blended in a weight ratio of 30/70–90/10, so as to provide the organic polyisocyanate used in the present embodiment. If the ratio of the purified MDI is lower than 30 wt. %, the obtained soft polyurethane foam has an increased hardness value, so that its feel is deteriorated. Further, the rebound resilience percentage of the soft polyurethane foam undesirably tends to be high, if the ratio of the purified MDI is lower than 30 wt. %. On the other hand, if the ratio of the purified MDI is higher than 90 wt. %, the organic polyisocyanate is crystallized at a low temperature, making its handling difficult. In the present embodiment, a prepolymer having terminal isocyanates in its ends may be preferably used as the organic polyisocyanate, which prepolymer is obtained by partially urethane-modifying a mixture of the purified MDI and the crude MDI which are mixed in a weight ratio of 30/70–90/10, with the polyol component.

In the reaction between the organic polyisocyanate described above and the selected polyol component, a suitable mono-ol compound represented by the above formula (1) is present in the reaction system, to provide the soft polyurethane foam having the low rebound resilience percentage and the temperature dependency of the compression force deflection (Δ25%CFD) as desired.

In the above formula (1) that represents the mono-ol compound, if n is larger than 20, the rebound resilience percentage of the obtained soft polyurethane foam is not sufficiently lowered and its productivity is deteriorated. Further, if x, y or the sum of x and y is larger than 20, the mono-ol compound is solidified, making its handling difficult, and the rebound resilience percentage of the obtained soft polyurethane foam is not lowered, whereby its productivity is deteriorated. Accordingly, in the above formula (1), n is an integer of 0–20, x and y represent respective different ones of integers 0–20, and the sum of x and y is in the range of 0–20. Preferably, n is an integer of 0–10, x and y represent respective different ones of integers 0–10, and the sum of x and y is in the range of 0–10.

Examples of the compound represented by the above formula (1) include: alkylphenols such as phenol, methylphenol, ethylphenol, propylphenol, butylphenol, pentylphenol, hexylphenol, heptylphenol, octylphenol and nonylphenol; and substances obtained by addition polymerization of ethylene oxide and/or propylene oxide to the alkylphenols. In the present embodiment, it is preferable to use nonylphenol or a substance obtained by addition polymerization of 1–10 mol of ethylene oxide to nonylphenol.

The mono-ol compound represented by the above formula (1) is used in an amount of 0.005–0.1 mol per 100 g of the polyol component. If the amount of the mono-ol compound is smaller than 0.005 mol, the soft polyurethane foam to be obtained does not have a sufficiently lowered rebound resilience percentage. On the other hand, though the amount of the mono-ol compound larger than 0.1 mol is effective to lower the rebound resilience percentage of the obtained soft polyurethane foam, it results in deterioration of the productivity of the soft polyurethane foam, a rise in the compression force deflection value at a low temperature, and an increase in the temperature dependency of the compression force deflection. The mono-ol compound represented by the above formula (1) is used preferably in an amount of 0.01–0.08 mol per 100 g of the polyol component.

In the above-described polyurethane-forming reactions: between the active hydrogen compound and the organic polyisocyanate; between the polyol component and the organic polyisocyanate in the presence of the monohydric alcohol; and between the polyol component and the organic polyisocyanate in the presence of the mono-ol component, water is used in an amount of 2.0–6.0 parts by weight, preferably 2.5–5.0 parts by weight, per 100 parts by weight of the active hydrogen compound or the polyol component. The water reacts with the isocyanate group in the polyisocyanate to produce $CO_2$ gas, so that the desired polyurethane foam is obtained. Thus, the water functions as a foaming agent. If the amount of water to be used is smaller than 2.0 parts by weight, the obtained polyurethane foam is not foamed to a satisfactory extent, to thereby increase its density. The amount of water exceeding 6.0 parts by weight does not significantly increase the foaming ratio. In this case, the obtained soft polyurethane foam suffers from a lowered quality such as irregular voids or cells.

In the above-described polyurethane-forming reactions, suitable additives known in the art such as a catalyst, a cross-linking agent, a foaming agent, a foam stabilizer, a flame retardant, a viscosity-reducing agent, a stabilizer, a filler and a coloring agent are added to the respective reaction mixtures. As the catalyst, amine urethane catalysts such as triethylenediamine and dimethylethanolamine or organometallic urethane catalysts such as tin laurate and tin octanoate are used. In the present invention, while the water is generally used as the foaming agent, flon, methylene chloride and $CO_2$ may be used as the foaming agent in addition to, or in place of the water, for instance. Examples of the foam stabilizer include "SRX-274C" available from Toray-Dow Corning Corporation, Japan, "L-5390" available from NIPPON YUNICOR KABUSHIKI KAISHA, Japan, and "B-4113" available from GOLDSCHMIDT, Germany. As the cross-linking agent, triethanolamine or diethanolamine is generally used.

In producing the desired soft polyurethane foam by the reaction between the active hydrogen compound and the organic polyisocyanate according to the above-described first embodiment, the respective suitable amounts of water, the catalyst, the cross-linking agent, the foam stabilizer and other auxiliaries are mixed with the active hydrogen compound, so as to provide a resin premixture. To the thus prepared resin premixture, the organic polyisocyanate is added for reaction, to thereby provide the desired soft polyurethane foam. Described in detail, the resin premixture and the organic polyisocyanate are mixed by using a known urethane foaming device such that the mixture has an isocyanate index in the range of 60–110, preferably in the range of 65–100. The mixture is poured into a suitable mold, and then foamed, whereby the soft polyurethane foam having a desired shape is obtained.

In producing the desired soft polyurethane foam by the reaction between the polyol component and the organic polyisocyanate in the presence of the monohydric alcohol according to the above-described second embodiment, the respective suitable amounts of the monohydric alcohol, water, the catalyst, the cross-linking agent, the foam stabilizer and other auxiliaries are mixed with the polyol component, so as to provide a resin premixture. To the thus prepared resin premixture, the organic polyisocyanate is added for reaction, to thereby provide the desired soft polyurethane foam. Described in detail, the resin premixture and the organic polyisocyanate are mixed by using a known urethane foaming device such that the mixture has an isocyanate index in the range of 60–120, preferably in the range of 70–110. The mixture is poured into a suitable mold, and then foamed, whereby the soft polyurethane foam having a desired shape is obtained.

In producing the desired soft polyurethane foam by the reaction between the polyol component and the organic polyisocyanate in the presence of the mono-ol compound represented by the above formula (1) according to the above-described third embodiment, the respective suitable amounts of the mono-ol compound, water, the catalyst, the cross-linking agent, the foam stabilizer, and other auxiliaries are mixed with the polyol component, so as to provide a resin premixture. To the thus prepared resin premixture, the organic polyisocyanate is added for reaction, to thereby provide the desired soft polyurethane foam. Described in detail, the resin premixture and the organic polyisocyanate are mixed by using a known urethane foaming device such that the mixture has an NCO/OH ratio in the range of 0.60–1.10. The mixture is poured into a suitable mold, and then foamed, whereby the soft polyurethane foam having a desired shape is obtained. If the NCO/OH ratio is lower than 0.60, the hardness of the obtained polyurethane foam is too low, while the hardness of the polyurethane foam is too high and its productivity is deteriorated if the NCO/OH ratio is higher than 1.10.

EXAMPLES

To further clarify the present invention, there will be described some examples of the present invention. It is to be understood that the present invention is not limited to the details of the following examples, but may be embodied with various changes, modifications and improvements which may occur to those skilled in the art without departing from the scope of the present invention defined in the attached claims. In the following examples, the units "parts" and "%" are on a weight basis unless otherwise specified.

Examples 1–15 and Comparative Examples 1–18

I. Preparation of organic polyisocyanates A-M
(1) Organic polyisocyanate A

To polymethylene polyphenylisocyanate consisting of 82.0 parts of purified MDI which contains 35.0% of 2,4'-MDI isomer, and 18.0 parts of crude MDI which consists of 43.0% of MDI and 57.0% of methylene-crosslinked polyphenylpolyisocyanate having at least three benzene nuclei and an NCO content of 31.0%, there was added 16.0 parts of an isocyanate-modifying polyether polyol which is obtained by addition polymerization of propylene oxide as alkylene oxide to glycerin as a starting material (functionality of the starting material=3; hydroxyl equivalent=1700; and EO content=0%). The mixture was reacted at 80° C. for two hours while it was stirred, to thereby provide an organic polyisocyanate A (NCO content=28.1%) in the form of a prepolymer.

(2) Organic polyisocyanate B

To polymethylene polyphenylisocyanate consisting of 82.0 parts of purified MDI which contains 27.0% of 2,4'-MDI isomer, and 18.0 parts of crude MDI which consists of 43.0% of MDI and 57.0% of methylene-crosslinked polyphenylpolyisocyanate having at least three benzene nuclei and an NCO content of 31.0%, there was added 14.8 parts of an isocyanate-modifying polyether polyol which is obtained by addition polymerization of propylene oxide and ethylene oxide as alkylene oxide to dipropylene glycol as a starting material (functionality of the starting material=2; hydroxyl equivalent=1400; and EO content=20%). The mixture was reacted at 80° C. for two hours while it was stirred, to thereby provide an organic polyisocyanate B (NCO content=:28.4%) in the form of a prepolymer.

(3) Organic polyisocyanate C

To polymethylene polyphenylisocyanate consisting of 78.0 parts of purified MDI which contains 29.0% of 2,4'-MDI isomer, and 22.0 parts of crude MDI which consists of 43.0% of MDI and 57.0% of methylene-crosslinked polyphenylpolyisocyanate having at least three benzene nuclei and an NCO content of 31.0%, there was added 21.0 parts of an isocyanate-modifying polyether polyol which is obtained by addition polymerization of propylene oxide and ethylene oxide as alkylene oxide to pentaerythritol as a starting material (functionality of the starting material=4; hydroxyl equivalent=900; and EO content=14%). The mixture was reacted at 80° C. for two hours while it was stirred, to thereby provide an organic polyisocyanate C (NCO content=26.5%) in the form of a prepolymer.

(4) Organic polyisocyanate D

To polymethylene polyphenylisocyanate consisting of 78.0 parts of purified MDI which contains 38.0% of 2,4'-MDI isomer, and 22.0 parts of crude MDI which consists of 43.0% of MDI and 57.0% of methylene-crosslinked polyphenylpolyisocyanate having at least three benzene nuclei and an NCO content of 31.0%, there was added 24.3 parts of an isocyanate-modifying polyether polyol which is obtained by addition polymerization of propylene oxide and ethylene oxide as alkylene oxide to dipropylene glycol as a starting material (functionality of the starting material=2; hydroxyl equivalent=1000; and EO content=72%). The mixture was reacted at 80° C. for two hours while it was stirred, to thereby provide an organic polyisocyanate D (NCO content=25.7%) in the form of a prepolymer.

(5) Organic polyisocyanate E

To polymethylene polyphenylisocyanate consisting of 78.0 parts of purified MDI which contains 25.0% of 2,4'-MDI isomer, and 22.0 parts of crude MDI which consists of 43.0% of MDI and 57.0% of methylene-crosslinked polyphenylpolyisocyanate having at least three benzene nuclei and an NCO content of 31.0%, there were added 8.0 parts of the isocyanate-modifying polyether polyol used in the preparation of the organic polyisocyanate A (functionality of the starting material=3; hydroxyl equivalent=1700; and EO content=0%) and 8.0 parts of the isocyanate-modifying polyether polyol used in the preparation of the organic polyisocyanate B (functionality of the starting material=2; hydroxyl equivalent=1400; and EO content=20%). The mixture was reacted at 80° C. for two hours while it was stirred, to thereby provide an organic polyisocyanate E (NCO content=23.4%) in the form of a prepolymer.

(6) Organic polyisocyanate F

The organic polyisocyanate F (NCO content=28.1%) in the form of a prepolymer was prepared in a manner similar to that in the preparation of the organic polyisocyanate A, except that 18.0 parts of an isocyanate-modifying polyether polyol (functionality of the starting material=5; hydroxyl equivalent=1700; and EO content=30%) was reacted with polymethylene polyphenylisocyanate, which isocyanate-modifying polyether polyol was obtained by addition polymerization of propylene oxide and ethylene oxide as alkylene oxide to a mixture of sorbitol and water in a mixing ratio of 75/25 as a starting material.

(7) Organic polyisocyanate G

The organic polyisocyanate G (NCO content=25.7%) in the form of a prepolymer was prepared in a manner similar to that in the preparation of the organic polyisocyanate B, except that 24.3 parts of an isocyanate-modifying polyether polyol (functionality of the starting material=1; hydroxyl equivalent=1000; and EO content=10%) was reacted with polymethylene polyphenylisocyanate, which isocyanate-modifying polyether polyol was obtained by addition polymerization of propylene oxide and ethylene oxide as alkylene oxide to methanol as a starting material.

(8) Organic polyisocyanate H

The organic polyisocyanate H (NCO content=28.1%) in the form of a prepolymer was prepared in a manner similar to that in the preparation of the organic polyisocyanate B, except that 16.0 parts of an isocyanate-modifying polyether polyol (functionality of the starting material=3; hydroxyl equivalent=1700; and EO content=95%) was reacted with polymethylene polyphenylisocyanate, which isocyanate-modifying polyether polyol was obtained by addition polymerization of propylene oxide and ethylene oxide as alkylene oxide to glycerin as a starting material. The thus obtained organic polyisocyanate H was deposited after it was left at the room temperature for two hours, so that this organic polyisocyanate H could not be used for forming the soft polyurethane foam described below.

(9) Organic polyisocyanate I

To polymethylene polyphenylisocyanate consisting of 68.0 parts of purified MDI which contains 40.1% of 2,4'-MDI isomer, and 32.0 parts of crude MDI which consists of 40.0% of MDI and 60.0% of methylene-crosslinked polyphenylpolyisocyanate having at least three benzene nuclei and an NCO content of 30.0%, there was added 27.3 parts of an isocyanate-modifying polyether polyol which is obtained by addition polymerization of propylene oxide as alkylene oxide to glycerin as a starting material (functionality of the starting material=3; hydroxyl equivalent=3000; and EO content=0%). The mixture was reacted at 80° C. for two hours while it was stirred, to thereby provide an organic polyisocyanate I (NCO content=21.4%) in the form of a prepolymer.

(10) Organic polyisocyanate J

The organic polyisocyanate J (NCO content=29.0%) in the form of a prepolymer was prepared in a manner similar to that in the preparation of the organic polyisocyanate D, except that 11.0 parts of an isocyanate-modifying polyether polyol (functionality of the starting material=3; hydroxyl equivalent=600; and EO content=0%) was reacted with polymethylene polyphenylisocyanate, which isocyanate-modifying polyether polyol was obtained by addition polymerization of propylene oxide as alkylene oxide to glycerin as a starting material.

(11) Organic polyisocyanate K

As the organic polyisocyanate K (NCO content=33.0%), polymethylene polyphenylisocyanate was used, which consists of 78.0 parts of purified MDI containing 38.0% of 2,4'-MDI isomer, and 22.0 parts of crude MDI consisting of 43.0% of MDI and 57.0% of methylene-crosslinked polyphenylpolyisocyanate having at least three benzene nuclei and an NCO content of 31.0%.

(12) Organic polyisocyanate L

As the organic polyisocyanate L (NCO content=48.3%), TDI (mixture of two isomers, i.e., 2,4-TDI and 2,6-TDI in a mixing ratio of 80/20) was used.

(13) Organic polyisocyanate M

To 50.0 parts of crude MDI consisting of 43.0% of MDI and 57.0% of methylene-crosslinked polyphenylpolyisocyanate having at least three benzene nuclei, 50.0 parts of the TDI (mixture of two isomers, i.e., 2,4-TDI and 2,6-TDI in a mixing ratio of 80/20) used in the preparation of the organic polyisocyanate L was added. The mixture was stirred for one hour, so as to provide an organic polyisocyanate M (NCO content=39.6%).

II. Preparation of active hydrogen compounds (1) Polyether triol A

The polyether triol A was obtained by addition-polymerizing ethylene oxide to ends of addition-polymerization product of propylene oxide to glycerin as a starting material. The polyether triol A has a hydroxyl equivalent of 750 and an EO content of 15%.

(2) Polyether triol B

The polyether triol B was obtained by addition-polymerizing ethylene oxide to ends of addition-polymerization product of propylene oxide to glycerin as a starting material. The polyether triol B has a hydroxyl equivalent of 1600 and an EO content of 17%.

(3) Polyether triol C

The polyether triol C was obtained by addition-polymerizing ethylene oxide to ends of addition-polymerization product of propylene oxide to glycerin as a starting material. The polyether triol C has a hydroxyl equivalent of 900 and an EO content of 15%.

(4) Polyether trial D

The polyether trial D was obtained by addition-polymerizing ethylene oxide to ends of addition-polymerization product of propylene oxide to glycerin as a starting material. The polyether triol D has a hydroxyl equivalent of 1350 and an EO content of 20%.

(5) Polyether diol E

The polyether diol E was obtained by addition-polymerizing ethylene oxide to ends of addition-polymerization product of propylene oxide to dipropylene glycol as a starting material. The polyether diol E has a hydroxyl equivalent of 1010 and an EO content of 25%.

(6) Polyether diol F

The polyether diol F was obtained by addition-polymerizing ethylene oxide to ends of addition-polymerization product of propylene oxide to dipropylene glycol as a starting material. The polyether diol F has a hydroxyl equivalent of 1500 and an EO content of 20%.

(7) Polyether diol G

The polyether diol G was obtained by addition-polymerizing ethylene oxide to ends of addition-polymerization product of propylene oxide to dipropylene glycol as a starting material. The polyether diol G has a hydroxyl equivalent of 1800 and an EO content of 20%.

(8) Polyether diol H

The polyether diol H was obtained by addition-polymerizing ethylene oxide to ends of addition-polymerization product of propylene oxide to dipropylene glycol as a starting material. The polyether diol H has a hydroxyl equivalent of 750 and an EO content of 17%.

(9) Polyether polyol I

The polyether polyol I was obtained by polymerizing 10 parts of acrylonitrile and 10 parts of styrene in the presence of 80 parts of the polyether triol C prepared as described above.

III. Preparation of various resin premixtures

There were prepared various resin premixtures by using the active hydrogen compounds prepared as described above, so that each resin premixture has the following composition.

| | |
|---|---|
| active hydrogen compound | 100.0 parts |
| silicone foam stabilizer | 1.0 part |
| ("SRX-274C" available from | |
| Toray·DOW Corning, Corporation, Japan) | |
| amine catalyst (1) | 0.50 part |
| ("L-1020" available from | |
| KATSUZAI CHEMICAL, Co., Ltd., Japan) | |
| amine catalyst (2) | 0.10 part |
| ("A-1" available from | |
| KATSUZAI CHEMICAL, Co., Ltd., Japan) | |
| water | 3.5–4.0 parts |

The resin premixtures and the organic polyisocyanates prepared as described above were mixed in various combinations as indicated in the following Tables 1–3 (Examples 1–15 according to the present invention and Comparative Eamples 1–8). By using the thus obtained mixtures, various energy absorbing headrests as shown in FIG. 1 were produced. Described in detail, a bag-like skin member 2 having an inside space and a core member 8 which has an insert 4 made of polypropylene were disposed in a molding cavity of a suitable mold. Then, each of the mixtures prepared as described above was poured into the mold and reacted by heating, so that the mixture was foamed to provide a soft polyurethane foam which gives a pad material 10 filling the inside space of the bag-like skin member 2. Thus, there was obtained a desired headrest in which the core member 8 is embedded in the pad material 10. During the foaming operation to provide the pad material 10, the soft polyurethane foam obtained by expansion of the mixture filled the inside space of the skin member 2 while pressing the skin member 2 against the inner surfaces of the mold which define the molding cavity, whereby the obtained headrest had a configuration following that of the molding cavity, and had an integral structure wherein the skin member 2, the core member 8 and the pad material 10 are bonded with one another. In the obtained headrest, a distance between a point P on the surface of the skin member 2 and the surface of the core member 8 (as seen in the transverse direction of FIG. 1) was 60 mm.

Figure 3:
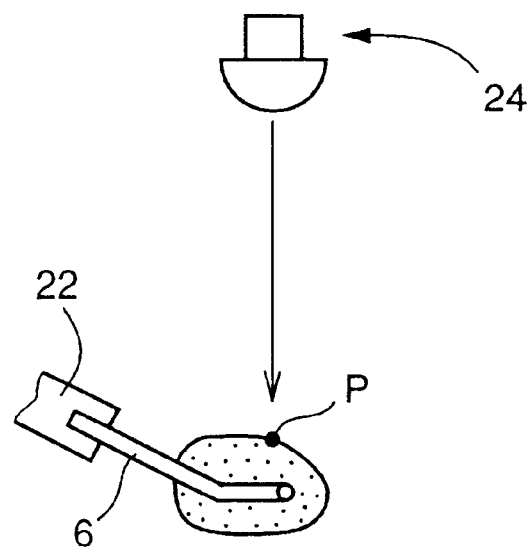
FIG. 3 is a view schematically explaining an experiment using headrests according to the present invention and according to comparative examples.

Each of the thus produced headrest was subjected to the following experiment. Initially, as shown in FIG. 3, the stay 6 of the headrest was supported by a jig 22 such that the above-mentioned point P is to face a head-shaped member 24 which is disposed at an initial position above the headrest, from which the member 24 is dropped onto the headrest. Namely, the head-shaped member 24 having a weight of 6.9 kg hits the headrest at the point P, at a collision speed of 6.2km/Hr, and the rebound distance of the head-shaped member 24 upon collision was measured. On the basis of the measured rebound distance, the energy absorbing ratio of the headrest was calculated by the following formula on the assumption that the stay 6 of the headrest was not deformed, and that the head-shaped member 24 rebounded in the vertical direction.

energy absorbing ratio=$[1-(½·V_1^2)/(½·V_0^2+gh)] \times 100$ (%)

Figure 4:
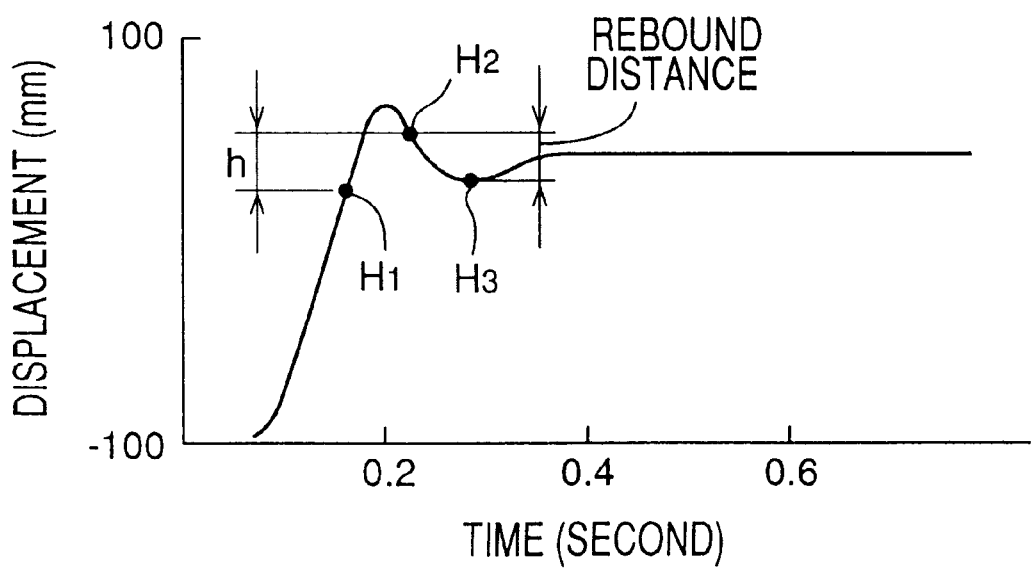
FIG. 4 is a graph showing a time-displacement curve upon application of an impact to the headrest of Example 4 according to the first embodiment and the headrest of Example 23 according to the third embodiment of the present invention.
Figure 5:
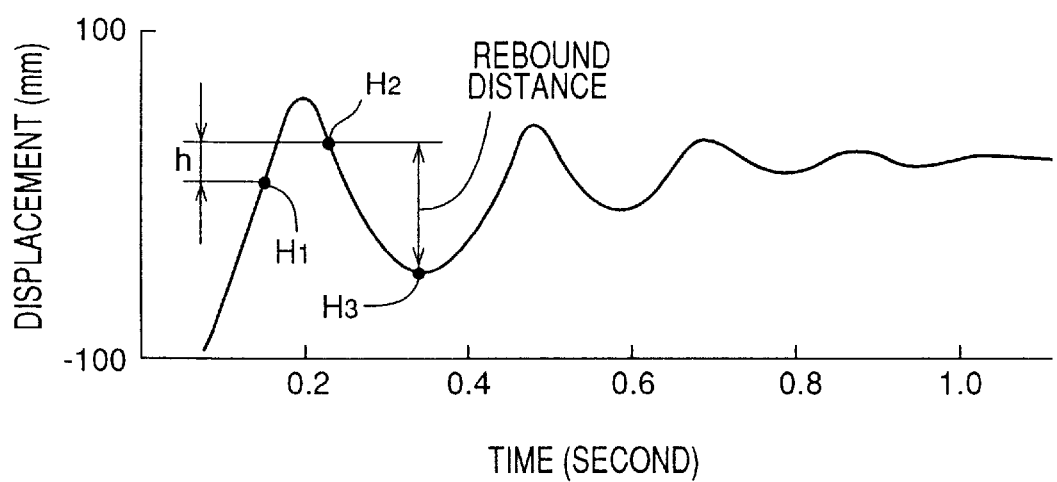
FIG. 5 is a graph showing a time-displacement curve upon application of an impact to the headrest of Comparative Example 4 according to the first embodiment and the headrest of Comparative Example 11 according to the third embodiment.

In the above formula, $V_0$, $V_1$ and g represent an initial collision speed, an initial rebounding speed, and a gravitational acceleration, respectively, while h represents, as shown in the graphs of FIGS. 4 and 5, a difference between a position H1 of the head-shaped member 24 at the moment of its collision with the headrest at the point P and a position H2 of the head-shaped member 24 at the moment of its rebounding. The rebound distance of the head-shaped member 24 is represented by a difference between the position H2 and a point H3 which is the lowest point in the waveforms of the graphs of FIGS. 4 and 5. The headrest having a larger energy absorbing ratio is capable of effectively protecting the vehicle passenger from the whiplash injury due to the spring back of the headrest.

From each of the headrests produced as described above, the pad material 10 was cut off, to thereby provide a specimen of the soft polyurethane foam. Each specimen was measured of its rebound resilience percentage and the temperature dependency of the compression force deflection ($\Delta 25\%$CFD). The rebound resilience percentage was obtained by using the specimen having a thickness of 30 mm, in accordance with the method A specified in section "9. Rebound resilience" of JIS-K-6400(1997). The 25%-compression force deflection values were measured at $-20°$ C. and $+20°$ C., respectively, by using the specimen having a size of 50 mm×50 mm×25 mm$^r$, according to ASTM-D-3574. The temperature dependency of the compression force deflection ($\Delta 25\%$CFD) was calculated by subtracting the 25%-compression force deflection value at $+20°$ C. from the 25%-compression force deflection value at $-20°$ C.

The calculated energy absorbing ratio of each headrest, the rebound resilience percentage and the temperature dependency of the compression force deflection ($\Delta 25\%$CFD) of the soft polyurethane foam of each headrest are indicated in the following Tables 1–3. The time (minutes) required before each headrest obtained by the foaming operation can be removed from the mold, i.e., curing time, is also shown in the Tables.

TABLE 1

| | Present invention | | | | | | |
|---|---|---|---|---|---|---|---|
| | 1 | 2 | 3 | 4 | 5 | 6 | 7 |
| Composition of resin premixture (parts) | | | | | | | |
| polyether triol C | 75 | 35 | — | 60 | — | 60 | 50 |
| polyether triol D | — | — | 30 | — | 30 | — | — |
| polyether diol E | 25 | 30 | 70 | 40 | — | 40 | — |
| polyether diol F | — | — | — | — | 45 | — | 50 |
| polymer polyol I | — | 30 | — | — | 25 | — | — |
| water | 4.0 | 3.8 | 3.8 | 4.0 | 4.0 | 4.0 | 4.0 |
| silicone foam stabilizer | 1.0 | 1.0 | 1.0 | 1.0 | 1.0 | 1.0 | 1.0 |
| amine catalyst (1) | 0.5 | 0.5 | 0.5 | 0.5 | 0.5 | 0.5 | 0.5 |
| amine catalyst (2) | 0.1 | 0.1 | 0.1 | 0.1 | 0.1 | 0.1 | 0.1 |
| organic polyisocyanate | A | D | E | B | C | A | A |
| NCO index | 80 | 80 | 80 | 80 | 80 | 80 | 80 |
| rebound resilience percentage (%) | 22 | 22 | 17 | 13 | 24 | 17 | 21 |
| energy absorbing ratio (%) | 80 | 80 | 81 | 82 | 80 | 82 | 81 |
| 25%-compression force deflection × 10$^3$ (kg/cm$^2$) | | | | | | | |
| $-20°$ C. | 92 | 92 | 77 | 92 | 84 | 99 | 86 |
| $+20°$ C. | 77 | 73 | 60 | 73 | 72 | 81 | 68 |
| $\Delta 25\%$ CFD × 10$^3$ (kg/cm$^2$) | 15 | 19 | 17 | 19 | 12 | 18 | 18 |
| curing time (minutes) | 4 | 4 | 6 | 4 | 4 | 4 | 4 |

TABLE 2

| | Present invention | | | | | | | |
|---|---|---|---|---|---|---|---|---|
| | 8 | 9 | 10 | 11 | 12 | 13 | 14 | 15 |
| Composition of resin premixture (parts) | | | | | | | | |
| polyether triol C | — | 50 | — | 50 | — | 60 | 60 | — |
| polyether triol D | 45 | — | 10 | — | — | — | — | 45 |
| polyether diol E | 55 | 50 | — | — | — | 40 | 40 | 55 |
| polyether diol F | — | — | 90 | 50 | 55 | — | — | — |
| polymer polyol I | — | — | — | — | 45 | — | — | — |
| water | 3.5 | 3.5 | 3.8 | 4.0 | 4.0 | 4.0 | 4.0 | 3.8 |
| silicone foam stabilizer | 1.0 | 1.0 | 1.0 | 1.0 | 1.0 | 1.0 | 1.0 | 1.0 |
| amine catalyst (1) | 0.5 | 0.5 | 0.5 | 0.5 | 0.5 | 0.5 | 0.5 | 0.5 |
| amine catalyst (2) | 0.1 | 0.1 | 0.1 | 0.1 | 0.1 | 0.1 | 0.1 | 0.1 |
| organic polyisocyanate | A | A | A | G | K | L | M | M |
| NCO index | 80 | 80 | 80 | 80 | 80 | 80 | 80 | 85 |
| rebound resilience percentage (%) | 24 | 15 | 17 | 13 | 20 | 25 | 23 | 28 |
| energy absorbing ratio (%) | 80 | 83 | 83 | 83 | 82 | 80 | 80 | 80 |
| 25%-compression force deflection × 10$^3$ (kg/cm$^2$) | | | | | | | | |
| $-20°$ C. | 82 | 90 | 98 | 74 | 101 | 93 | 94 | 96 |
| $+20°$ C. | 68 | 73 | 78 | 55 | 82 | 66 | 70 | 72 |
| $\Delta 25\%$ CFD × 10$^3$ (kg/cm$^2$) | 14 | 17 | 20 | 19 | 19 | 27 | 24 | 24 |
| curing time (minutes) | 4 | 4 | 6 | 7 | 4 | 4 | 4 | 4 |

TABLE 3

| | Comparative Examples | | | | | | | |
|---|---|---|---|---|---|---|---|---|
| | 1 | 2 | 3 | 4 | 5 | 6 | 7 | 8 |
| Composition of resin premixture (parts) | | | | | | | | |
| polyether triol A | — | — | 65 | — | 60 | — | — | — |
| polyether triol B | — | — | — | 50 | — | — | — | — |
| polyether triol C | 90 | — | — | — | — | 60 | — | 50 |
| polyether triol D | — | — | — | — | — | — | 45 | — |
| polyether diol E | 10 | — | — | — | — | 40 | 55 | 50 |
| polyether diol F | — | 55 | — | — | — | — | — | — |

TABLE 3-continued

| | Comparative Examples | | | | | | | |
|---|---|---|---|---|---|---|---|---|
| | 1 | 2 | 3 | 4 | 5 | 6 | 7 | 8 |
| diol F polyether | — | — | — | 50 | 40 | — | — | — |
| diol G polyether | — | — | 35 | — | — | — | — | — |
| diol H polymer polyol I | — | 45 | — | — | — | — | — | — |
| water | 4.0 | 4.0 | 3.8 | 4.0 | 4.0 | 4.0 | 3.5 | 3.5 |
| silicone foam stabilizer | 1.0 | 1.0 | 1.0 | 1.0 | 1.0 | 1.0 | 1.0 | 1.0 |
| amine catalyst (1) | 0.5 | 0.5 | 0.5 | 0.5 | 0.5 | 0.5 | 0.5 | 0.5 |
| amine catalyst (2) | 0.1 | 0.1 | 0.1 | 0.1 | 0.1 | 0.1 | 0.1 | 0.1 |
| organic polyisocyanate | A | J | B | C | D | F | H | I |
| NCO index | 80 | 80 | 80 | 80 | 80 | 80 | 80 | 80 |
| rebound resilience percentage (%) | 37 | 14 | 10 | 55 | 18 | 32 | * | 43 |
| energy absorbing ratio (%) | 73 | 84 | 85 | 63 | 82 | 75 | | 68 |
| 25%-compression force deflection × $10^3$ (kg/cm$^2$) | | | | | | | | |
| −20° C. | 101 | 124 | 119 | 73 | 109 | 98 | | 87 |
| +20° C. | 84 | 85 | 78 | 63 | 74 | 81 | | 71 |
| Δ25% CFD × $10^3$ (kg/cm$^2$) | 17 | 39 | 41 | 10 | 35 | 17 | | 16 |
| curing time (minutes) | 4 | 4 | 4 | 4 | 4 | 4 | — | 4 |

*: Since the organic polyisocyanate H was deposited, it could not be used in the polyurethane-forming reaction.

As is apparent from the results indicated in the above Tables 1–2, the headrests of the Examples 1–15 according to the present invention had the energy absorbing ratios higher than 80%, which is high enough to protect the vehicle passenger from suffering from the whiplash injury due to the spring back of the headrests. This is because these headrests use as the pad material 10 the soft polyurethane foam having the rebound resilience percentage of not higher than 30%. Further, since the temperature dependency of the compression force deflection (Δ25%CFD) of the soft polyurethane foam which gives the pad material 10 is not larger than 0.030 kg/cm$^2$, the difference between the 25%-compression force deflection value at the low temperature (−20° C.) and the 25%-compression force deflection value at the room temperature (+20° C.) is small. Accordingly, the hardness of each headrest is not likely to vary with the ambient temperature, whereby the headrest can give a good feel to the passenger, assuring good cushioning characteristics.

The comparison between the result in the Example 4 and the result in the Example 13, 14 or 15 shows that the use of TDI as the organic polyisocyanate causes an increase in the rebound resilience percentage and a rise of the temperature dependency of the compression force deflection (Δ25%CFD). In view of this, it is preferable to use only MDI as the organic polyisocyanate. As is apparent from the graph of FIG. 4 which shows a time-displacement curve obtained when the above-described experiment (FIG. 3) was conducted on the headrest of the Example 4 according to the present invention, in which the rebound distance of the head-shaped member 24 was measured, the head-shaped member 24 rebounded only once, and its rebound distance was relatively small.

On the contrary, the results indicated in the above Table 3 show that the headrests according to the Comparative Examples 1–8 suffered from various problems. For instance, in the headrest according to the Comparative Example 1, the rebound resilience percentage of the soft polyurethane foam that gives the pad material 10 is comparatively high since the amount of the polyether polyol C was excessive, thereby undesirably lowering the energy absorbing ratio of the headrest. In the headrest of the Comparative Example 2, the temperature dependency of the compression force deflection (Δ25%CFD) of the soft polyurethane foam that gives the pad material 10 was comparatively large since the hydroxyl equivalent of the isocyanate-modifying polyether polyol used in forming the organic polyisocyanate J was below 800. The soft polyurethane foam that gives the pad material 10 of the headrest of the Comparative Example 3 had increased temperature dependency of the compression force deflection (Δ25%CFD) since the hydroxyl equivalents of the polyether triol A and the polyether diol H were smaller than the specified values. Further, in the headrest according to the Comparative Example 4, the soft polyurethane foam that gives the pad material 10 suffered from a high rebound resilience percentage, lowering the energy absorbing ratio of the headrest since the hydroxyl equivalents of the polyether triol B and the polyether diol G were larger than 1500. As is apparent from the graph of FIG. 5 which shows a time-displacement curve obtained when the above-described experiment (FIG. 3) was conducted on the headrest of the Comparative Example 4, in which the rebound distance of the head-shaped member 24 was measured, the head-shaped member 24 periodically and repeatedly rebounded, and its rebound distance was relatively large.

In the headrest of the Comparative Example 5, the soft polyurethane foam had increased temperature dependency of the compression force deflection (Δ25%CFD) since the hydroxyl equivalent of the polyether triol A was smaller than 900. In the headrest of the Comparative Example 6, the soft polyurethane foam had a high rebound resilience percentage, and an accordingly low energy absorbing ratio of the headrest, since the average functionality of the isocyanate-modifying polyether polyol used in forming the organic polyisocyanate F was larger than 4. In the headrest according to the Comparative Example 7, the organic polyisocyanate H was solidified at the room temperature since the EO content of the isocyanate-modifying polyether polyol used in forming the organic polyisocyanate H was larger than 80%. Therefore, the organic polyisocyanate H could not be used in forming the soft polyurethane foam. Further, the soft polyurethane foam that gives the pad material 10 of the headrest according to the Comparative Example 8 had a high rebound resilience percentage and an accordingly low energy absorbing ratio of the headrest, since the hydroxyl equivalent of the isocyanate-modifying polyether polyol used in forming the organic polyisocyanate F was larger than 2000.

Examples 16–17 and Comparative Example 9

There were prepared various resin premixtures by using, as a polyol component, POL-A (polyether polyol available from MITSUI CHEMICALS, INC., Japan and having an average molecular weight of 2000, an OH value of 56, and a functionality of 2), POL-B (polymer polyol (styrene polymerization composition) available from ASAHI DENKA KOGYO CO., Ltd., Japan and having an average molecular weight of 6700, an OH value of 25, a functionality of 3), and POL-C (polyether polyol available from MITSUI CHEMICALS, INC., Japan and having an average molecular weight of 6000, an OH value of 28, and a functionality of 3). As a foaming agent, water was used while an amine catalyst (1) ("L-1020" available from KATSUZAI CHEMICAL CO., Ltd., Japan) and an amine catalyst (2) ("A-1" available from KATSUZAI CHEMICAL CO., Ltd., Japan) were used as a catalyst. The resin premixtures in Examples 16 and 17 according to the present invention, methanol (having a molecular weight of 32) and propanol (having a molecular weight of 60) were used, respectively, as a monohydric alcohol. The resin premixture prepared as a Comparative Example 9 did not contain the monohydric alcohol. The resin premixtures had the respective compositions as indicated in the following Table 4.

To the respective resin premixtures prepared as described above, ISO (i.e., MDI polyisocyanate having an NCO content of 27.3% and available from MITSUI CHEMICALS, INC., Japan) as an organic polyisocyanate component was added in the respective amounts as indicated in the Table 4. Each of the thus obtained mixtures was poured into a mold having a suitable molding cavity, and reacted at a mold temperature of 43±2° C., to thereby provide a soft polyurethane foam.

For each of the obtained soft polyurethane foams, the rebound resilience percentage, the 25% compression force deflection values (25%CFD) at 20° C., 0° C., and −20° C., and the temperature dependency of the compression force deflection (Δ25%CFD) were obtained. Described in detail, the rebound resilience percentage was measured in accordance with the method A in section "9. Rebound resilience" of JIS-K-6400 (1997) by using a specimen of the soft polyurethane foam having a size of 80 mm×80 mm×30 mm$^t$. The 25%-compression force deflection values were obtained according to ASTM-D-3574 by using a specimen of the soft polyurethane foam having a size of 50 mm×50 mm×25 mm$^t$. Namely, the specimen of the soft polyurethane foam had an initial height which is its height upon receiving an initial load of 30 g. The specimen of the soft polyurethane foam having the initial height was compressed by 25%, so that the 25%-compression force deflection values were obtained. The temperature dependency of the compression force deflection (Δ25%CFD) is indicated as a difference between the 25%-compression force deflection value at −20° C. and the 25%-compression force deflection value at +20° C. The results of the measurements are indicated in the following Table 5.

TABLE 4

| | Compostition (parts) | | |
|---|---|---|---|
| | Comparative Example | Present invention | |
| | 9 | 16 | 17 |
| Compostion of resin premixture (parts) | | | |
| POL-A | 100.0 | 60.0 | — |
| POL-B | — | 40.0 | — |
| POL-C | — | — | 100.0 |

TABLE 4-continued

| | Compostition (parts) | | |
|---|---|---|---|
| | Comparative Example | Present invention | |
| | 9 | 16 | 17 |
| water | 3.8 | 3.8 | 3.8 |
| amine catalyst (1) | 0.50 | 0.50 | 0.50 |
| amine catalyst (2) | 0.10 | 0.10 | 0.10 |
| methanol | — | 1.0 | — |
| propanol | — | — | 3.0 |
| ISO | 57.8 | 69.3 | 65.4 |
| average molecular weight of polyol component | 2000 | 4480 | 6000 |

TABLE 5

| | Comparative Example | Present invention | |
|---|---|---|---|
| | 9 | 16 | 17 |
| rebound resilience percentage at the room temperature (%) | 27 | 27 | 27 |
| 25% CFD at +20° C. (kg/cm$^2$) | 0.054 | 0.053 | 0.052 |
| 25% CFD at 0° C. (kg/cm$^2$) | 0.103 | 0.066 | 0.063 |
| 25% CFD at −20° C. (kg/cm$^2$) | 0.175 | 0.081 | 0.076 |
| Δ25% CFD (kg/cm$^2$) | 0.121 | 0.028 | 0.024 |
| curing time (minutes) | 15 | 4.5 | 3 |

As is apparent from the results indicated in the above Table 5, the soft polyurethane foam of the Comparative Example 9 had comparatively large temperature dependency of the compression force deflection (Δ25%CFD), so that its hardness was comparatively high at a relatively low ambient temperature, resulting in deterioration of its feel or cushioning characteristics. In contrast, owing to the addition of the monohydric alcohols to the resin premixtures, the soft polyurethane foams of the Examples 16 and 17 of the present invention had rebound resilience percentage values as low as the soft polyurethane foam according to the Comparative Example 9 even when the polyol components having high molecular weights are included. Further, the soft polyurethane foams of the Examples 16 and 17 of the present invention had comparatively small temperature dependency of the compression force deflection (Δ25%CFD), and was free from deterioration of the feel or the cushioning characteristics thereof at a relatively low ambient temperature. Accordingly, the soft polyurethane foams of the Examples 16 and 17 of the present invention are suitable for practical use. Moreover, in producing the soft polyurethane foams of the Examples 16 and 17 of the present invention, the required time before the obtained polyurethane foams can be removed from the mold (i.e., curing time) was significantly reduced as compared to that of the polyurethane foam according to the Comparative Example 9, assuring excellent productivity thereof.

Examples 18–22 and Comparative Example 10

Various soft polyurethane foams (Examples 18–22 according to the present invention) were obtained by using various monohydric alcohols as indicated in the following Table 6 in different amounts ranging from 1.0 part to 3.0 parts, in the same manner as in the above Examples 16 and 17. A soft polyurethane foam as a Comparative Example 10 was produced without using the monohydric alcohol. The composition of the resin premixtures for forming the respective soft polyurethane foams are indicated below.

| | |
|---|---:|
| POL-A | 60.0 parts |
| POL-B | 40.0 parts |
| water (foaming agent) | 3.8 parts |
| monohydric alcohols | 1.0–3.0 parts |
| amine catalyst (1) | 0.50 part |
| amine catalyst (2) | 0.10 part |
| purified MDI (prepolymer) | 60.0 parts |
| crude MDI | 40.0 parts |

*The polyol component as a whole had an average molecular weight of 4480.

As in the above Examples 16 and 17, the rebound resilience percentage at the room temperature was obtained for each of the soft polyurethane foams. The results of the measurement are also indicated in the Table 6. As is apparent from the results, the soft polyurethane foams of the Examples 18–22 according to the present invention had effectively lowered rebound resilience percentages owing to the addition of the monohydric alcohols, as compared with the soft polyurethane foam of the Comparative Example 10.

TABLE 6

| | monohydric alcohol | | | rebound resilience |
|---|---|---|---|---|
| | type | molecular weight | amount (parts) | percentage (%) |
| Present Invention | | | | |
| 18 | methanol | 32 | 1.0 | 27 |
| | | | 2.0 | 20 |
| | | | 3.0 | 15 |
| 19 | ethanol | 46 | 1.0 | 27 |
| | | | 2.0 | 23 |
| | | | 3.0 | 18 |
| 20 | propanol | 60 | 1.0 | 27 |
| | | | 2.0 | 25 |
| | | | 3.0 | 22 |
| 21 | butanol | 74 | 1.0 | 28 |
| | | | 2.0 | 24 |
| | | | 3.0 | 22 |
| 22 | pentanol | 88 | 1.0 | 27 |
| | | | 2.0 | 26 |
| | | | 3.0 | 26 |
| Comparative Example 10 | without containing monohydric alcohol | | | 32 |

Examples 23–34 and Comparative Examples 11–14

I. Preparation of materials

The organic polyisocyanate, the polyol components, and the mono-ol compounds represented by the above formula (1) used in the Examples 22–33 according to the present invention and in the Comparative Examples 11–14 are as follows.

(1) Polyisocyanate A (organic polyisocyanate component)

The polyisocyanate A is a prepolymer having terminal isocyanate groups, which polyisocyanate A has an NCO content of 28.0% and was obtained by partially urethane-modifying a mixture of purified MDI and crude MDI which were mixed in a ratio of 70/30, with polyoxyalkylene polyol having a hydroxyl equivalent of 1670 and a functionality of 3.

(2) Polyol A (the polyol component)

The polyol A is a polyether polyol having a hydroxyl equivalent of 1020, which was obtained by addition polymerization of a mixture of propylene oxide and ethylene oxide which were mixed in a ratio of 85/15, to glycerin.

(3) Polyol B (the polyol component)

The polyol B is a polyether polyol having a hydroxyl equivalent of 2000, which was obtained by addition polymerization of a mixture of propylene oxide and ethylene oxide which were mixed in a ratio of 85/15, to glycerin.

(4) Polyol C (the polyol component)

The polyol C is a polyether polyol having a hydroxyl equivalent of 800, which was obtained by addition polymerization of a mixture of propylene oxide and ethylene oxide which were mixed in a ratio of 85/15, to glycerin.

(5) Polyol D (the polyol component)

The polyol D is a polyether polyol having a hydroxyl equivalent of 1500, which was obtained by addition polymerization of a mixture of propylene oxide and ethylene oxide which were mixed in a ratio of 80/20, to dipropylene glycol.

(6) Polyol E (the polyol component)

The polyol E is a polyether polyol having a hydroxyl equivalent of 1650, which was obtained by addition polymerization of a mixture of propylene oxide and ethylene oxide which were mixed in a ratio of 85/15, to sorbitol.

(7) Polyol F (the polyol component)

The polyol F is a polymer polyol obtained by polymerizing acrylonitrile in a polyether polyol which has a hydroxyl equivalent of 1650 and was obtained by addition polymerization of a mixture of propylene oxide and ethylene oxide which were mixed in a ratio of 85/15, to glycerin.

(8) Compound <1> (the mono-ol compound)

The compound <1> is a nonyl phenol.

(9) Compound <2> (the mono-ol compound)

The compound <2> is a mono-ol obtained by addition polymerization of 1 mol of ethylene oxide to a nonyl phenol.

(10) Compound <3> (the mono-ol compound)

The compound <3> is a mono-ol obtained by addition polymerization of 3 mol of ethylene oxide to a nonyl phenol.

(11) Compound <4> (the mono-ol compound)

The compound <4>is a mono-ol obtained by addition polymerization of 10 mol of ethylene oxide to a nonyl phenol.

II. Preparation of resin premixtures

By using the polyol components and the mono-ol compounds as described above, there were prepared various resin premixtures having the following composition.

| | |
|---|---:|
| polyol component | 100.0 parts |
| silicone foam stabilizer | 1.0 part |
| ("SRX-274C" available from Toray·DOW Corning, Corporation, Japan) | |
| diethanol amine | 1.0 part |
| amine catalyst (1) | 0.5 part |
| ("L-1020" available from KATSUZAI CHEMICAL, CO., Ltd., Japan) | |
| amine catalyst (2) | 0.1 part |
| ("A-1" available from KATSUZAI CHEMICAL, CO., Ltd., Japan) | |
| water | 4.5 parts |
| mono-ol compound | 0.003–0.15 mol (per 100 g of the polyol component) |

The thus prepared resin premixtures and the organic polyisocyanate component were mixed so as to provide various mixtures having the respective compositions as indicated in the following Tables 7–10. By using the thus obtained mixtures (according to the Examples 23–34 of the present invention and according to the Comparative Examples 11–14), various energy-absorbing headrests were produced in the same manner as described with respect to the above Examples 1–15.

The produced headrests were subjected to the same experiment as described with respect to the above Examples 1–15, so that the energy absorbing ratio was calculated. The rebound resilience percentage, the 25%-compression force deflection values at −20° C. and at +20° C., and the temperature dependency of the compression force deflection (Δ25%CFD) were obtained for each of the headrests. Further, the time (minutes) required before each headrest obtained by the foaming operation can be demolded (i.e., curing time) was measured. The results of the measurement are also indicated in the Tables 7–10.

TABLE 7

| | Present invention | | | | |
|---|---|---|---|---|---|
| | 23 | 24 | 25 | 26 | 27 |
| Composition of resin premixture (parts) | | | | | |
| polyol A | 100 | 100 | 100 | 100 | 70 |
| polyol F | — | — | — | — | 30 |
| diethanol amine | 1 | 1 | 1 | 1 | 1 |
| silicone foam stabilizer | 1 | 1 | 1 | 1 | 1 |
| amine catalyst (1) | 0.5 | 0.5 | 0.5 | 0.5 | 0.5 |
| amine catalyst (2) | 0.1 | 0.1 | 0.1 | 0.1 | 0.1 |
| water | 4.5 | 4.5 | 4.5 | 4.5 | 4.5 |
| compound <1>* | 0.022 | — | — | — | 0.022 |
| compound <2>* | — | 0.019 | — | — | — |
| compound <3>* | — | — | 0.026 | — | — |
| compound <4>* | — | — | — | 0.015 | — |
| organic polyisocyanate | polyisocyanate A | | | | |
| NCO index | 90 | 90 | 90 | 90 | 90 |
| rebound resilience percentage (%) | 19 | 19 | 16 | 21 | 20 |
| energy absorbing ratio (%) | 80 | 82 | 83 | 80 | 80 |
| 25%-compression force deflection × $10^3$ (kg/cm$^2$) | | | | | |
| −20° C. | 90 | 91 | 89 | 97 | 99 |
| +20° C. | 75 | 78 | 70 | 79 | 80 |
| Δ25% CFD × $10^3$ (kg/cm$^2$) | 15 | 13 | 19 | 18 | 19 |
| curing time (minutes) | 4 | 4 | 4 | 4 | 4 |

*: molar amount per 100 g of the polyol component

TABLE 8

| | Present invention | | | | |
|---|---|---|---|---|---|
| | 28 | 29 | 30 | 31 | 32 |
| Composition of resin premixture (parts) | | | | | |
| polyol B | 100 | 100 | 100 | 100 | 80 |
| polyol F | — | — | — | — | 20 |
| diethanol amine | 1 | 1 | 1 | 1 | 1 |
| silicone foam stabilizer | 1 | 1 | 1 | 1 | 1 |
| amine catalyst (1) | 0.5 | 0.5 | 0.5 | 0.5 | 0.5 |
| amine catalyst (2) | 0.1 | 0.1 | 0.1 | 0.1 | 0.1 |
| water | 4.5 | 4.5 | 4.5 | 4.5 | 4.5 |
| compound <1>* | 0.045 | — | — | — | 0.045 |
| compound <2>* | — | 0.057 | — | — | — |
| compound <3>* | — | — | 0.026 | — | — |
| compound <4>* | — | — | — | 0.030 | — |
| organic polyisocyanate | polyisocyanate A | | | | |
| NCO index | 90 | 90 | 90 | 90 | 90 |
| rebound resilience percentage (%) | 24 | 21 | 25 | 25 | 23 |
| energy absorbing ratio (%) | 80 | 82 | 80 | 80 | 82 |
| 25%-compression force deflection × $10^3$ (kg/cm$^2$) | | | | | |
| −20° C. | 96 | 91 | 95 | 96 | 98 |
| +20° C. | 78 | 72 | 78 | 78 | 79 |
| Δ25% CFD × $10^3$ (kg/cm$^2$) | 18 | 19 | 17 | 18 | 19 |
| curing time (minutes) | 4 | 4 | 4 | 4 | 4 |

*: molar amount per 100 g of the polyol component

TABLE 9

| | Present invention | |
|---|---|---|
| | 33 | 34 |
| Composition of resin premixture (parts) | | |
| polyol A | 50 | — |
| polyol B | — | 70 |
| polyol D | 30 | — |
| polyol E | — | 10 |
| polyol F | 20 | 20 |
| diethanol amine | 1 | 1 |
| silicone foam stabilizer | 1 | 1 |
| amine catalyst (1) | 0.5 | 0.5 |
| amine catalyst (2) | 0.1 | 0.1 |
| water | 4.5 | 4.5 |
| compound <1>* | 0.022 | 0.045 |
| organic polyisocyanate | polyisocyanate A | |
| NCO index | 90 | 90 |
| rebound resilience percentage (%) | 19 | 24 |
| energy absorbing ratio (%) | 83 | 80 |
| 25%-compression force deflection × $10^3$ (kg/cm$^2$) | | |
| −20° C. | 94 | 99 |
| +20° C. | 76 | 79 |
| Δ25% CFD × $10^3$ (kg/cm$^2$) | 18 | 20 |
| curing time (minutes) | 4 | 4 |

*: molar amount per 100 g of the polyol component

TABLE 10

| | Comparative Examples | | | |
|---|---|---|---|---|
| | 11 | 12 | 13 | 14 |
| Compostion of resin premixture (parts) | | | | |
| polyol A | 100 | — | 100 | 100 |
| polyol C | — | 100 | — | — |
| diethanol amine | 1 | 1 | 1 | 1 |
| silicone foam stabilizer | 1 | 1 | 1 | 1 |
| amine catalyst (1) | 0.5 | 0.5 | 0.5 | 0.5 |
| amine catalyst (2) | 0.1 | 0.1 | 0.1 | 0.1 |
| water | 4.5 | 4.5 | 4.5 | 4.5 |
| compound <1>* | — | — | 0.003 | 0.150 |
| organic polyisocyanate | | polyisocyanate A | | |
| NCO index | 90 | 90 | 90 | 90 |
| rebound resilience percentage (%) | 35 | 25 | 31 | 13 |
| energy absorbing ratio (%) | 72 | 80 | 74 | 84 |
| 25%-compression force deflection × $10^3$ (kg/cm$^2$) | | | | |
| −20° C. | 95 | 124 | 95 | 100 |
| +20° C. | 78 | 79 | 78 | 65 |
| Δ25% CFD × $10^3$ (kg/cm$^2$) | 17 | 45 | 17 | 35 |
| curing time (minutes) | 4 | 4 | 4 | 20 |

*: molar amount per 100 g of the polyol component

As is apparent from the results indicated in the above Tables 7–9, each of the headrests of the Examples 23–34 according to the present invention had the energy absorbing ratio higher than 80%, and was capable of protecting the vehicle passengers from suffering from the whiplash injury due to the spring back of the headrests. This is because these headrests use as the pad material 10 the soft polyurethane foam having the rebound resilience percentage of not higher than 30%. Further, since the temperature dependency of the compression force deflection (Δ25%CFD) of the soft polyurethane foam which gives the pad material 10 is not larger than 0.030 kg/cm$^2$, the difference between the 25%-compression force deflection value at the low temperature (−20° C.) and the 25%-compression force deflection value at the room temperature (+20° C.) is relatively small. Accordingly, the hardness of each headrest is not likely to vary with the ambient temperature, whereby the headrest assures a good feel as felt by the passengers or good cushioning characteristics.

As is apparent from the graph of FIG. 4 which shows a time-displacement curve obtained when the above-described experiment (FIG. 3) was conducted on the headrest of the Example 23 according to the present invention, in which the rebound distance of the head-shaped member 24 was measured, the head-shaped member 24 rebounded only once, and its rebound distance was relatively small.

In contrast, it will be understood from the results indicated in the above Table 10 that the headrests according to the Comparative Examples 11–14 suffered from various problems. Namely, in the headrest of the Comparative Example 11 wherein the polyurethane-forming reaction was effected in the absence of the mono-ol compound represented by the above formula (1), the obtained soft polyurethane foam that gives the pad material 10 of the headrest had an undesirably high rebound resilience percentage, and an accordingly low energy absorbing ratio of the headrest. In the Comparative Example 12 wherein the use of the polyol component having a low hydroxyl equivalent results in lowered rebound resilience percentage of the obtained soft polyurethane foam and improved energy absorbing ratio of the headrest, the temperature dependency of the compression force deflection (Δ25%CFD) is undesirably large. Where the mono-ol compound represented by the formula (1) was present in the reaction system in a molar amount smaller than the specified lower limit as in the Comparative Example 13, the obtained soft polyurethane foam did not have the rebound resilience percentage of not higher than 30%. On the contrary, where the mono-ol compound represented by the formula (1) was present in the reaction system in a molar amount exceeding the specified upper limit as in the Comparative Example 14, the temperature dependency of the compression force deflection was significantly large, and a longer period of time was required before the headrest formed by the foaming operation could be demolded, though the rebound resilience percentage was lowered.

It will be understood from the above description that the soft polyurethane foam produced according to the present invention has the rebound resilience percentage of not higher than 30% and the temperature dependency of the compression force deflection (Δ25%CFD) of not larger than 0.030 kg/cm$^2$, assuring a high degree of energy absorbing characteristics as well as a good feel as given to the users, in other words, excellent cushioning characteristics. In particular, the hardness of the present soft polyurethane foam is not likely to be affected by a change in the ambient temperature, whereby the soft polyurethane foam according to the present invention can be advantageously used as a pad material of vehicle interior members such as a headrest and a seat back.

What is claimed is:

1. A soft polyurethane foam which has a rebound resilience percentage of not higher than 30% and whose temperature dependency of compression force deflection represented by a difference between a 25%-compression force deflection value at −20° C. and a 25%-compression force deflection value at +20° C. is not larger than 0.030 kg/cm$^2$.

2. A soft polyurethane foam according to claim 1, wherein both of said 25%-compression force deflection value at −20° C. and said 25%-compression force deflection value at +20° C. are not larger than 0.110 kg/cm$^2$.

3. A soft polyurethane foam according to claim 1 produced by reaction of a polyol component having an average molecular weight of 2000–8000 and an organic polyisocyanate, in the presence of a monohydric alcohol having a molecular weight of not larger than 100.

4. A soft polyurethane foam according to claim 2 produced by reaction of a polyol component and an organic polyisocyanate, wherein said polyol component comprises polyoxyalkylene polyol having an average functionality of 2–8 and a hydroxyl equivalent of 900–3300, and said reaction is effected in the presence of a compound represented by the following formula (1), in an amount of 0.005–0.1 mol per 100 g of said polyol component,

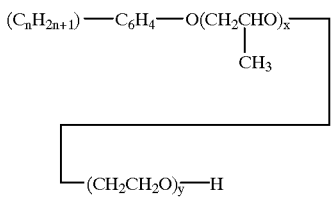

wherein, n is an integer of 0–20, x and y represent respective different ones of integers 0–20, and a sum of x and y is in a range of 0–20.

5. A soft polyurethane foam according to claim 4, wherein n is an integer of 0–9, x and y represent respective different ones of integers 0–10, and a sum of x and y is in a range of 0–10.

6. A soft polyurethane foam according to claim 4, wherein said compound represented by the above formula (1) is nonyl phenol or a substance obtained by addition polymerization of 1–10 mol of ethylene oxide to said nonyl phenol.

7. A method of producing a soft polyurethane foam by reacting an active hydrogen compound with an organic polyisocyanate using water, wherein said active hydrogen compound is a mixture of polyether triol having a hydroxyl equivalent of 900–1500 and containing 5–30 wt. % of terminal polyoxy ethylene units, and polyether diol having a hydroxyl equivalent of 1010–1500 and containing 5–30 wt. % of terminal polyoxy ethylene units, a weight ratio of said polyether triol to said polyether diol being in a range of 80/20–0/100, and said water is used in an amount of 2.0–6.0 parts by weight per 100 parts by weight of said active hydrogen compound.

8. A method according to claim 7, wherein said organic polyisocyanate is a mixture of polymethylene polyphenylisocyanate and 2,4-tolylenediisocyanate and/or 2,6-tolylenediisocyanate, a weight ratio of said polymethylene polyphenylisocyanate to said 2,4-tolylenediisocyanate and/or 2,6-tolylenediisocyanate being in a range of 100/0–70/30.

9. A method according to claim 7, wherein said organic polyisocyanate is a prepolymer having terminal isocyanate groups, said prepolymer being obtained by reacting polymethylene polyphenylisocyanate with at least one polyether polyol which has an average functionality of 1–4 and a hydroxyl equivalent of 800–2000 and which is obtained by addition polymerization of alkylene oxide having three or more carbon atoms, and ethylene oxide, in a molar ratio of 20/80–100/0.

10. A method according to claim 7, wherein said polyether triol and said polyether diol are mixed in a weight ratio of 70/30–40/60.

11. A method of producing a soft polyurethane foam having a rebound resilience percentage of not higher than 30%, by reaction of a polyol component having an average molecular weight of 2000–8000 with an organic polyisocyanate in the presence of water, wherein said reaction is effected in the presence of a monohydric alcohol having a molecular weight of not larger than 100.

12. A method according to claim 11, wherein said monohydric alcohol is used in an amount of 0.1–15 parts by weight per 100 parts by weight of said polyol component.

13. A method according to claim 11, wherein said monohydric alcohol is used in an amount of 0.5–5 parts by weight per 100 parts by weight of said polyol component.

14. A method according to claim 11, wherein said polyol component contains 30–70 wt. % of a polymer polyol.

15. A method according to claim 11, wherein said polyol component has an average molecular weight of 3000–6000.

16. A method of producing a soft polyurethane foam by reaction of an organic polyisocyanate and a mixture of a polyol component and water, said soft polyurethane foam having a rebound resilience percentage of not higher than 30%, and temperature dependency of compression force deflection represented by a difference between a 25%-compression force deflection value at −20° C. and a 25%-compression force deflection value at +20° C. being not larger than 0.030 kg/cm², wherein said polyol component comprises polyoxyalkylene polyol having an average functionality of 2–8 and a hydroxyl equivalent of 900–3300, and said reaction is effected in the presence of a compound represented by the following formula (1), in an amount of 0.005–0.1 mol per 100 g of said polyol component,

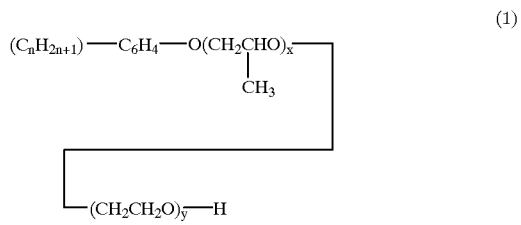

wherein, n is an integer of 0–20, x and y represent respective different ones of integers 0–20, and a sum of x and y is in a range of 0–20.

17. A method according to claim 16, wherein n is an integer of 0–9, x and y represent respective different ones of integers 0–10, and a sum of x and y is in a range of 0–10.

18. A method according to claim 16, wherein said compound represented by the above formula (1) is nonyl phenol or a substance obtained by addition polymerization of 1–10 mol of ethylene oxide to said nonyl phenol.

19. A method according to claim 16, wherein both of said 25%-compression force deflection value at −20° C. and said 25%-compression force deflection value at +20° C. are not larger than 0.110 kg/cm².

20. A vehicle interior member comprising a skin layer, and a pad layer covered by said skin layer so as to absorb external energy applied to said vehicle interior member, wherein at least a portion of said pad layer is formed of a soft polyurethane foam which has a rebound resilience percentage of not higher than 30% and whose temperature dependency of compression force deflection represented by a difference between a 25%-compression force deflection value at −20° C. and a 25%-compression force deflection value at +20° C. is not larger than 0.030 kg/cm².

21. A vehicle interior member according to claim 20, wherein both of said 25%-compression force deflection value at −20° C. and said 25%-compression force deflection value at +20° C. are not larger than 0.110 kg/cm².

22. A vehicle interior member according to claim 20, which is a headrest comprising a bag-like skin member as said skin layer, said skin member having an inside space, a pad material as said pad layer, said pad material filling said inside space of said skin member, and a core member having an inner portion fixed within said pad material and an outer portion projecting from a surface of said skin member, wherein at least a portion of said pad material is formed of said soft polyurethane foam.

23. A vehicle interior member according to claim 20, which is a seat back comprising a seat back cover as said skin layer, a seat back frame, and a seat back pad as said pad layer, said seat back pad being interposed between said seat back cover and said seat back frame, wherein at least a portion of said seat back pad is formed of said soft polyurethane foam.

24. A vehicle interior member according to claim 20, wherein said soft polyurethane foam is produced by reaction of a polyol component having an average molecular weight of 2000–8000 and an organic polyisocyanate, in the presence of a monohydric alcohol having a molecular weight of not larger than 100.

25. A vehicle interior member according to claim 20, wherein said polyurethane foam is produced by reaction of a polyol component with an organic polyisocyanate, wherein said polyol component comprises polyoxyalkylene polyol having an average functionality of 2–8 and a hydroxyl equivalent of 900–3300, and said reaction is effected in the presence of a compound represented by the following formula (1), in an amount of 0.005–0.1 mol per 100 g of said polyol component,

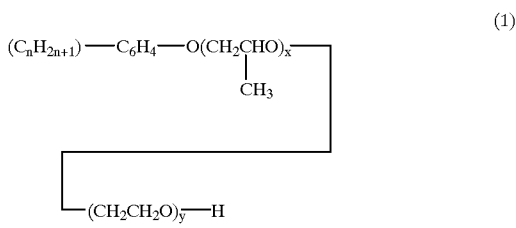

wherein, n is an integer of 0–20, x and y represent respective different ones of integers 0–20, and a sum of x and y is in a range of 0–20.

26. A soft polyurethane foam according to claim 25, wherein n is an integer of 0–9, x and y represent respective different ones of integers 0–10, and a sum of x and y is in a range of 0–10.

27. A soft polyurethane foam according to claim 25, wherein said compound represented by the above formula (1) is nonyl phenol or a substance obtained by addition polymerization of 1–10 mol of ethylene oxide to said nonyl phenol.

* * * * *